United States Patent
Maciejewski et al.

(10) Patent No.: US 10,230,925 B2
(45) Date of Patent: Mar. 12, 2019

(54) SYSTEMS AND METHODS FOR PROCESSING AND PROVIDING TERRESTRIAL AND/OR SPACE-BASED EARTH OBSERVATION VIDEO

(71) Applicant: URTHECAST CORP., Vancouver (CA)

(72) Inventors: Stanley Erik Maciejewski, San Francisco, CA (US); Manel de la Rosa Siles, San Francisco, CA (US); Daniel Lopez, Oakland, CA (US)

(73) Assignee: URTHECAST CORP., Vancouver (CA)

( * ) Notice: Subject to any disclaimer, the term of this patent is extended or adjusted under 35 U.S.C. 154(b) by 0 days.

(21) Appl. No.: 15/316,469

(22) PCT Filed: Jun. 12, 2015

(86) PCT No.: PCT/US2015/035628
§ 371 (c)(1),
(2) Date: Dec. 5, 2016

(87) PCT Pub. No.: WO2015/192056
PCT Pub. Date: Dec. 17, 2015

(65) Prior Publication Data
US 2017/0214889 A1 Jul. 27, 2017

Related U.S. Application Data

(60) Provisional application No. 62/011,935, filed on Jun. 13, 2014.

(51) Int. Cl.
*H04N 7/18* (2006.01)
*G11B 27/031* (2006.01)
*G06K 9/00* (2006.01)

(52) U.S. Cl.
CPC .......... *H04N 7/185* (2013.01); *G06K 9/0063* (2013.01); *G06K 9/00758* (2013.01); *G11B 27/031* (2013.01); *H04N 7/181* (2013.01)

(58) Field of Classification Search
None
See application file for complete search history.

(56) References Cited

U.S. PATENT DOCUMENTS 3,601,529 A 8/1971 Dischert
3,715,962 A 2/1973 Yost, Jr.
(Continued)

FOREIGN PATENT DOCUMENTS

CA 2 428 513 C 2/2008
CA 2 488 909 C 7/2010
(Continued)

OTHER PUBLICATIONS

European Office Action, dated Nov. 24, 2017, for European Application No. 14883549.9-1871, 8 pages.
(Continued)

*Primary Examiner* — Hung Q Dang
(74) *Attorney, Agent, or Firm* — Seed IP Law Group LLP

(57) ABSTRACT

Systems and methods are provided for processing and disseminating video data. A video disseminating portal is provided to show orders for video data, including status information of each order. A control in the portal is provided to launch a video display interface to preview or play an ordered video data. A video cropping tool in the video display interface allows a user to define one more areas within the ordered video data. The cropped video is generated along a pan path. In some embodiments, the cropped video is generated with variable zoom and orientation. The one or more defined areas are used to generate corresponding one or more cropped videos, which are derived from the
(Continued)

ordered video data. The location and area of a cropped video is displayed in context of the ordered video and can be previewed using the video display interface. A cropped video is also displayed as an entry in the portal in relation to the entry for the ordered video data.

15 Claims, 19 Drawing Sheets

(56) References Cited

U.S. PATENT DOCUMENTS

| | | |
|---|---|---|
| 3,808,357 A | 4/1974 | Nakagaki et al. |
| 4,163,247 A | 7/1979 | Bock et al. |
| 4,214,264 A | 7/1980 | Hayward et al. |
| 4,246,598 A | 1/1981 | Bock et al. |
| 4,404,586 A | 9/1983 | Tabei |
| 4,514,755 A | 4/1985 | Tabei |
| 4,656,508 A | 4/1987 | Yokota |
| 4,803,645 A | 2/1989 | Ohtomo et al. |
| 4,823,186 A | 4/1989 | Muramatsu |
| 4,951,136 A | 8/1990 | Drescher et al. |
| 5,313,210 A | 5/1994 | Gail |
| 5,489,907 A | 2/1996 | Zink et al. |
| 5,512,899 A | 4/1996 | Osawa et al. |
| 5,546,091 A | 8/1996 | Haugen et al. |
| 5,552,787 A | 9/1996 | Schuler et al. |
| 5,745,069 A | 4/1998 | Gail |
| 5,790,188 A | 8/1998 | Sun |
| 5,883,584 A | 3/1999 | Langemann et al. |
| 5,949,914 A | 9/1999 | Yuen |
| 6,241,192 B1 | 6/2001 | Kondo et al. |
| 6,259,396 B1 | 7/2001 | Pham et al. |
| 6,347,762 B1 | 2/2002 | Sims et al. |
| 6,359,584 B1 | 3/2002 | Cordey et al. |
| 6,741,250 B1 * | 5/2004 | Furlan ............... G06T 19/003 345/427 |
| 6,781,707 B2 | 8/2004 | Peters et al. |
| 7,015,855 B1 | 3/2006 | Medl et al. |
| 7,019,777 B2 | 3/2006 | Sun |
| 7,095,359 B2 | 8/2006 | Matsuoka et al. |
| 7,149,366 B1 | 12/2006 | Sun |
| 7,158,878 B2 | 1/2007 | Rasmussen et al. |
| 7,167,280 B2 | 1/2007 | Bogdanowicz et al. |
| 7,169,280 B2 | 1/2007 | Bogdanowicz et al. |
| 7,242,342 B2 | 7/2007 | Wu et al. |
| 7,292,723 B2 | 11/2007 | Tedesco et al. |
| 7,298,922 B1 | 11/2007 | Lindgren et al. |
| 7,327,305 B2 | 2/2008 | Loehner et al. |
| 7,379,612 B2 | 5/2008 | Milanfar et al. |
| 7,385,705 B1 | 6/2008 | Hoctor et al. |
| 7,412,107 B2 | 8/2008 | Milanfar et al. |
| 7,414,706 B2 | 8/2008 | Nichols et al. |
| 7,423,577 B1 | 9/2008 | McIntire et al. |
| 7,475,054 B2 | 1/2009 | Hearing et al. |
| 7,477,802 B2 | 1/2009 | Milanfar et al. |
| 7,536,365 B2 | 5/2009 | Aboutalib |
| 7,599,790 B2 | 10/2009 | Rasmussen et al. |
| 7,602,997 B2 | 10/2009 | Young |
| 7,623,064 B2 | 11/2009 | Calderbank et al. |
| 7,646,326 B2 | 1/2010 | Antonik et al. |
| 7,698,668 B2 | 4/2010 | Balasubramanian et al. |
| 7,733,961 B2 | 6/2010 | O'Hara et al. |
| 7,769,229 B2 | 8/2010 | O'Brien et al. |
| 7,769,241 B2 | 8/2010 | Adams, Jr. et al. |
| 7,825,847 B2 | 11/2010 | Fujimura |
| 7,830,430 B2 | 11/2010 | Adams, Jr. et al. |
| 7,844,127 B2 | 11/2010 | Adams, Jr. et al. |
| 7,855,752 B2 | 12/2010 | Baker et al. |
| 7,897,902 B2 | 3/2011 | Katzir et al. |
| 7,924,210 B2 | 4/2011 | Johnson |
| 7,936,949 B2 | 5/2011 | Riley et al. |
| 7,940,282 B2 | 5/2011 | Milanfar et al. |
| 7,940,959 B2 | 5/2011 | Rubenstein |
| 7,991,226 B2 | 8/2011 | Schultz et al. |
| 8,040,273 B2 | 10/2011 | Tomich et al. |
| 8,045,024 B2 | 10/2011 | Kumar et al. |
| 8,068,153 B2 | 11/2011 | Kumar et al. |
| 8,073,246 B2 | 12/2011 | Adams, Jr. et al. |
| 8,078,009 B2 | 12/2011 | Riley et al. |
| 8,094,960 B2 | 1/2012 | Riley et al. |
| 8,111,307 B2 | 2/2012 | Deever et al. |
| 8,116,576 B2 | 2/2012 | Kondo |
| 8,125,370 B1 | 2/2012 | Rogers et al. |
| 8,125,546 B2 | 2/2012 | Adams, Jr. et al. |
| 8,179,445 B2 | 5/2012 | Hao |
| 8,180,851 B1 | 5/2012 | CaveLie |
| 8,203,615 B2 | 6/2012 | Wang et al. |
| 8,203,633 B2 | 6/2012 | Adams, Jr. et al. |
| 8,204,966 B1 | 6/2012 | Mendis et al. |
| 8,212,711 B1 | 7/2012 | Schultz et al. |
| 8,299,959 B2 | 10/2012 | Vossiek et al. |
| 8,358,359 B2 | 1/2013 | Baker et al. |
| 8,384,583 B2 | 2/2013 | Leva et al. |
| 8,411,146 B2 | 4/2013 | Twede |
| 8,482,452 B2 | 7/2013 | Chambers et al. |
| 8,487,996 B2 | 7/2013 | Mann et al. |
| 8,493,264 B2 | 7/2013 | Sasakawa |
| 8,532,958 B2 | 9/2013 | Ingram et al. |
| 8,543,255 B2 | 9/2013 | Wood et al. |
| 8,594,375 B1 | 11/2013 | Padwick |
| 8,698,668 B2 | 4/2014 | Hellsten |
| 8,711,029 B2 | 4/2014 | Ferretti et al. |
| 8,724,918 B2 | 5/2014 | Abraham |
| 8,768,104 B2 | 7/2014 | Moses et al. |
| 8,823,813 B2 | 9/2014 | Mantzel et al. |
| 8,860,824 B2 | 10/2014 | Jelinek |
| 8,879,793 B2 | 11/2014 | Peterson |
| 8,879,865 B2 | 11/2014 | Li et al. |
| 8,891,066 B2 | 11/2014 | Bamler et al. |
| 8,903,134 B2 | 12/2014 | Abileah |
| 8,977,062 B2 | 3/2015 | Gonzalez et al. |
| 9,019,143 B2 | 4/2015 | Obermeyer |
| 9,019,144 B2 | 4/2015 | Calabrese |
| 9,063,544 B2 | 6/2015 | Vian et al. |
| 9,071,337 B2 | 6/2015 | Hellsten |
| 9,126,700 B2 | 9/2015 | Ozkul et al. |
| 9,134,414 B2 | 9/2015 | Bergeron et al. |
| 9,176,227 B2 | 11/2015 | Bergeron et al. |
| 9,244,155 B2 | 1/2016 | Bielas |
| 9,389,311 B1 | 7/2016 | Moya et al. |
| 9,395,437 B2 | 7/2016 | Ton et al. |
| 9,400,329 B2 | 7/2016 | Pillay |
| 9,417,323 B2 | 8/2016 | Carande et al. |
| 2002/0012071 A1 | 1/2002 | Sun |
| 2003/0006364 A1 | 1/2003 | Katzir et al. |
| 2003/0193589 A1 | 10/2003 | Lareau et al. |
| 2005/0270299 A1 | 12/2005 | Rasmussen et al. |
| 2005/0288859 A1 | 12/2005 | Golding et al. |
| 2007/0024879 A1 | 2/2007 | Hamilton, Jr. et al. |
| 2007/0080830 A1 | 4/2007 | Sacks |
| 2007/0120979 A1 | 5/2007 | Zhang et al. |
| 2007/0168370 A1 | 7/2007 | Hardy |
| 2008/0024390 A1 | 1/2008 | Baker et al. |
| 2008/0123997 A1 | 5/2008 | Adams et al. |
| 2008/0240602 A1 | 10/2008 | Adams et al. |
| 2008/0278775 A1 | 11/2008 | Katzir et al. |
| 2009/0011777 A1 | 1/2009 | Grunebach et al. |
| 2009/0021588 A1 | 1/2009 | Border et al. |
| 2009/0046182 A1 | 2/2009 | Adams, Jr. et al. |
| 2009/0046995 A1 | 2/2009 | Kanumuri et al. |
| 2009/0087087 A1 | 4/2009 | Palum et al. |
| 2009/0147112 A1 | 6/2009 | Baldwin |
| 2009/0226114 A1 | 9/2009 | Choi et al. |
| 2009/0256909 A1 | 10/2009 | Nixon |
| 2010/0039313 A1 | 2/2010 | Morris |
| 2010/0045513 A1 | 2/2010 | Pett et al. |
| 2010/0128137 A1 | 5/2010 | Guidash |
| 2010/0149396 A1 | 6/2010 | Summa et al. |
| 2010/0232692 A1 | 9/2010 | Kumar et al. |
| 2010/0302418 A1 | 12/2010 | Adams, Jr. et al. |
| 2010/0309347 A1 | 12/2010 | Adams, Jr. et al. |
| 2010/0321235 A1 | 12/2010 | Vossiek et al. |
| 2010/0328499 A1 | 12/2010 | Sun |

(56) References Cited

U.S. PATENT DOCUMENTS

| | | |
|---|---|---|
| 2011/0052095 A1 | 3/2011 | Deever |
| 2011/0055290 A1 | 3/2011 | Li et al. |
| 2011/0115793 A1 | 5/2011 | Grycewicz |
| 2011/0134224 A1 | 6/2011 | McClatchie |
| 2011/0156878 A1 | 6/2011 | Wu et al. |
| 2011/0187902 A1 | 8/2011 | Adams, Jr. et al. |
| 2011/0199492 A1 | 8/2011 | Kauker et al. |
| 2011/0279702 A1 | 11/2011 | Plowman et al. |
| 2011/0282871 A1 | 11/2011 | Seefeld et al. |
| 2012/0019660 A1* | 1/2012 | Golan ............ H04N 5/232 348/144 |
| 2012/0105276 A1 | 5/2012 | Ryland |
| 2012/0127028 A1 | 5/2012 | Bamler et al. |
| 2012/0127331 A1 | 5/2012 | Grycewicz |
| 2012/0133550 A1 | 5/2012 | Benninghofen et al. |
| 2012/0154584 A1 | 6/2012 | Omer et al. |
| 2012/0200703 A1* | 8/2012 | Nadir ............ G02B 27/644 348/144 |
| 2012/0201427 A1 | 8/2012 | Jasinski et al. |
| 2012/0257047 A1 | 10/2012 | Biesemans et al. |
| 2012/0271609 A1 | 10/2012 | Laake et al. |
| 2012/0274505 A1 | 11/2012 | Pritt et al. |
| 2012/0293669 A1 | 11/2012 | Mann et al. |
| 2012/0300064 A1 | 11/2012 | Mann et al. |
| 2012/0323992 A1 | 12/2012 | Brobst et al. |
| 2013/0021475 A1 | 1/2013 | Canant et al. |
| 2013/0050488 A1 | 2/2013 | Brouard et al. |
| 2013/0063489 A1 | 3/2013 | Hourie et al. |
| 2013/0080594 A1 | 3/2013 | Nourse et al. |
| 2014/0009326 A1 | 1/2014 | Wishart |
| 2014/0027576 A1 | 1/2014 | Boshuizen et al. |
| 2014/0062764 A1 | 3/2014 | Reis et al. |
| 2014/0068439 A1 | 3/2014 | Lacaze et al. |
| 2014/0078153 A1 | 3/2014 | Richardson |
| 2014/0149372 A1 | 5/2014 | Sankar et al. |
| 2014/0307950 A1 | 10/2014 | Jancsary et al. |
| 2014/0344296 A1 | 11/2014 | Chawathe et al. |
| 2015/0015692 A1 | 1/2015 | Smart |
| 2015/0080725 A1 | 3/2015 | Wegner |
| 2015/0331097 A1 | 11/2015 | Hellsten |
| 2015/0369913 A1 | 12/2015 | Jung et al. |
| 2015/0371431 A1 | 12/2015 | Korb et al. |
| 2015/0378018 A1 | 12/2015 | Calabrese |
| 2015/0379957 A1 | 12/2015 | Roegelein et al. |
| 2016/0012367 A1 | 1/2016 | Korb et al. |
| 2016/0019458 A1 | 1/2016 | Kaufhold |
| 2016/0020848 A1 | 1/2016 | Leonard |
| 2016/0033639 A1 | 2/2016 | Jung et al. |
| 2016/0103216 A1 | 4/2016 | Whelan et al. |
| 2016/0139259 A1 | 5/2016 | Rappaport et al. |
| 2016/0139261 A1 | 5/2016 | Becker |
| 2016/0300375 A1 | 10/2016 | Beckett et al. |
| 2016/0306824 A1 | 10/2016 | Lopez et al. |
| 2018/0172824 A1 | 6/2018 | Beckett et al. |

FOREIGN PATENT DOCUMENTS

| | | |
|---|---|---|
| CN | 101907704 A | 12/2010 |
| DE | 20 2009 003 286 U1 | 5/2009 |
| EP | 1 698 856 A2 | 9/2006 |
| EP | 2 242 252 A2 | 10/2010 |
| EP | 2 392 943 B1 | 11/2012 |
| EP | 2 560 144 A2 | 2/2013 |
| EP | 2 610 636 A1 | 7/2013 |
| EP | 2 778 635 A1 | 9/2014 |
| EP | 2 767 849 B1 | 1/2016 |
| EP | 2 784 537 B1 | 10/2016 |
| EP | 3 077 985 | 10/2016 |
| EP | 3 077 986 | 10/2016 |
| JP | 60-257380 A | 12/1985 |
| WO | 02/18874 A1 | 3/2002 |
| WO | 2003/005059 A1 | 1/2003 |
| WO | 2009/085305 A1 | 7/2009 |
| WO | 2011/138744 A2 | 11/2011 |
| WO | 2011/154804 A1 | 12/2011 |
| WO | 2012/120137 A1 | 9/2012 |
| WO | 2012/143756 A1 | 10/2012 |
| WO | 2012/148919 A2 | 11/2012 |
| WO | 2014/097263 A1 | 6/2014 |
| WO | 2015/112263 A2 | 7/2015 |
| WO | 2015/130365 A2 | 9/2015 |
| WO | 2015/192056 A1 | 12/2015 |
| WO | 2016/132106 A1 | 8/2016 |
| WO | 2016/202662 A1 | 12/2016 |
| WO | 2016/205406 A1 | 12/2016 |
| WO | 2017/048339 A1 | 3/2017 |

OTHER PUBLICATIONS

Fox et al., "Synthetic Aperture Radar Imaging Apparatus and Methods for Moving Targets," U.S. Appl. No. 62/510,191, filed May 23, 2017, 24 pages.

Preliminary Amendment, filed Dec. 15, 2017, for U.S. Appl. No. 15/737,044, Beckett et al., "Systems and Methods for Enhancing Synthetic Aperture Radar Imagery," 10 pages.

Preliminary Amendment, filed Jun. 2, 2016, for U.S. Appl. No. 15/101,336, Lopez et al., "Systems and Methods for Earth Observation," 9 pages.

Preliminary Amendment, filed Jun. 2, 2016, for U.S. Appl. No. 15/101,344, Beckett et al., "Systems and Methods for Processing and Distributing Earth Observation Images," 11 pages.

Beckett et al., "Systems and Methods for Enhancing Synthetic Aperture Radar Imagery," U.S. Appl. No. 62/180,449, filed Jun. 16, 2015, 34 pages.

Extended European Search Report, dated Oct. 24, 2016, for European Application No. 14880012.1-1951 / 3077985, 10 pages.

Extended European Search Report, dated Oct. 24, 2016, for European Application No. 14883549.9-1951 / 3077986, 10 pages.

International Preliminary Report on Patentability, dated Jun. 7, 2016, for International Application No. PCT/US2014/068642, 10 pages.

International Preliminary Report on Patentability, dated Jun. 7, 2016, for International Application No. PCT/US2014/068645, 14 pages.

International Preliminary Report on Patentability, dated Dec. 15, 2016, for International Application No. PCT/US2015/035628, 8 pages.

International Search Report, dated Aug. 27, 2015, for International Application No. PCT/US2014/068642, 4 pages.

International Search Report, dated Sep. 2, 2015, for International Application No. PCT/US2014/068645, 3 pages.

International Search Report and Written Opinion of the International Searching Authority, dated Sep. 21, 2015, for International Application No. PCT/US2015/035628, 12 pages.

International Search Report and Written Opinion of the International Searching Authority, dated Sep. 23, 2016, for International Application No. PCT/US2016/037681, 10 pages.

Lopez et al., "Systems and Methods for Earth Observation," U.S. Appl. No. 61/911,914, filed Dec. 4, 2013, 177 pages.

Maciejewski et al., "Systems and Methods for Processing and Providing Video," U.S. Appl. No. 62/011,935, filed Jun. 13, 2014, 52 pages.

Makar et al., "Real-Time Video Streaming With Interactive Region-of-Interest," Proceedings of 2010 IEEE 17$^{th}$ International Conference on Image Processing, Sep. 26-29, 2010, Hong Kong, pp. 4437-4440.

Notice of Allowance, dated Mar. 9, 2017, for Beckett et al., "Systems and Methods for Processing and Distributing Earth Observation Images," 10 pages.

Souissi et al., "Investigation of the capability of the Compact Polarmetry mode to Reconstruct Full Polarimetry mode using RADARSAT2 data," *Advanced Electromagnetics* 1(1), May 2012, 10 pages.

Written Opinion of the International Searching Authority, dated Aug. 27, 2015, for International Application No. PCT/US2014/068642, 9 pages.

(56) References Cited

OTHER PUBLICATIONS

Written Opinion of the International Searching Authority, dated Sep. 2, 2015, for International Application No. PCT/US2014/068645, 13 pages.
"ISR Systems and Technology," Lincoln Laboratory, Massachusetts Institute of Technology, archived Jan. 19, 2017, URL=https://www.ll.mit.edu/mission/isr/israccomplishments.html, download date Oct. 8, 2018, 2 pages.
"Northrop's SABR radar completes auto target cueing capability demonstration," May 20, 2013, URL=https://www.airforce-technology.com/news/newsnorthrops-sabr-radar-completes-auto-target-cueing-capability-demonstration/, download date Oct. 8, 2018, 3 pages.
Beckett, "UrtheCast Second-Generation Earth Observation Sensors," $36^{th}$ *International Symposium on Remote Sensing of Environment*, Berlin, Germany, May 11-15, 2015, pp. 1069-1073.
Boccia, "Bathymetric Digital Elevation Model Generation from L-band and X-band Synthetic Aperture Radar Images in the Gulf of Naples, Italy: Innovative Techniques and Experimental Results," doctoral thesis, University of Naples Federico II, Naples, Italy, 2015, 161 pages.
Di Iorio et al., "Innovation Technologies and Applications for Coastal Archaeological sites FP7-ITACA," $36^{th}$ *International Symposium on Remote Sensing of Environment*, Berlin, Germany, May 11-15, 2015, pp. 1367-1373.
Extended European Search Report, dated May 14, 2018, for European Application No. 16812363.6-1206, 8 pages.
Fard et al., "Classifier Fusion of High-Resolution Optical and Synthetic Aperture Radar (SAR) Satellite Imagery for Classification in Urban Area," $1^{st}$ *International Conference on Geospatial Information Research*, Tehran, Iran, Nov. 15-17, 2014, 5 pages.
Forkuor et al., "Integration of Optical and Synthetic Aperture Radar Imagery for Improving Crop Mapping in Northwestern Benin, West Africa," *Remote Sensing* 6(7):6472-6499, 2014.
Heege et al., "Mapping of water depth, turbidity and sea state properties using multiple satellite sensors in aquatic systems," *Hydro 2010*, Rostock, Germany, Nov. 2-5, 2010, 27 pages.
Hoogeboom et al., "Integrated Observation Networks of the Future," $4^{th}$ *Forum on Global Monitoring for Environment and Security*, Baveno, Italy, Nov. 26-28, 2003, 14 pages.
Hossain et al., "Multi-Frequency Image Fusion Based on MIMO UWB OFDM Synthetic Aperture Radar," Chapter 3, in Miao (ed.), *New Advances in Image Fusion*, InTech, 2013, pp. 37-55. (21 pages).
Linne von Berg, "Autonomous Networked Multi-Sensor Imaging Systems," *Imaging Systems and Applications*, Monterey, California, USA, Jun. 24-28, 2012, 2 pages.
Linne von Berg, "Multi-Sensor Airborne Imagery Collection and Processing Onboard Small Unmanned Systems," *Proceedings of SPIE* 7668(1):766807, 2010. (11 pages).
Ma, "Application of RADARSAT-2 Polarimetric Data for Land Use and Land Cover Classification and Crop Monitoring in Southwestern Ontario," master's thesis, The University of Western Ontario, Canada, 2013, 145 pages.
Meilland et al., "A Unified Rolling Shutter and Motion Blur Model for 3D Visual Registration," *IEEE International Conference on Computer Vision*, Sydney, Australia, Dec. 1-8, 2013, pp. 2016-2023.
Office Action, dated Aug. 6, 2018, for U.S. Appl. No. 15/101,336, Lopez et al., "Systems and Methods for Earth Observation," 25 pages.
Pleskachevsky et al., "Synergy and fusion of optical and synthetic aperture radar satellite data for underwater topography estimation in coastal areas," *Ocean Dynamics* 61(12):2099-2120, 2011.
Raouf et al., "Integrated Use of SAR and Optical Data for Coastal Zone Management," *Proceedings of the $3^{rd}$ European Remote Sensing Symposium* vol. 2, Florence, Italy, Mar. 14-21, 1997, pp. 1089-1094.
Research Systems Inc., "ENVI Tutorials," ENVI Version 3.4, Sep. 2000, 590 pages.
Richardson, "By the Doppler's sharp stare," Oct. 1, 2003, *Armada International*, URL=https://www.thefreelibrary.com/_/print/PrintArticle.aspx?id=111508265, download date Oct. 8, 2018, 7 pages.
Sano et al., "Synthetic Aperture Radar (L band) and Optical Vegetation Indices for Discriminating the Brazilian Savanna Physiognomies: A Comparative Analysis," *Earth Interactions* 9(15):15, 2005. (15 pages).
Šindelář et al., "A Smartphone Application for Removing Handshake Blur and Compensating Rolling Shutter," *IEEE International Conference on Image Processing*, Paris, France, Oct. 27-30, 2014, pp. 2160-2162.
Šindelář et al., "Image deblurring in smartphone devices using built-in inertial measurement sensors," *Journal of Electronic Imaging* 22(1):011003, 2013. (22 pages).
Xia et al., "Classification of High Resolution Optical and SAR Fusion Image Using Fuzzy Knowledge and Object-Oriented Paradigm," *Geographic Object-Based Image Analysis* vol. XXXVIII-4/C7, Ghent, Belgium, Jun. 29-Jul. 2, 2010, 5 pages.

* cited by examiner

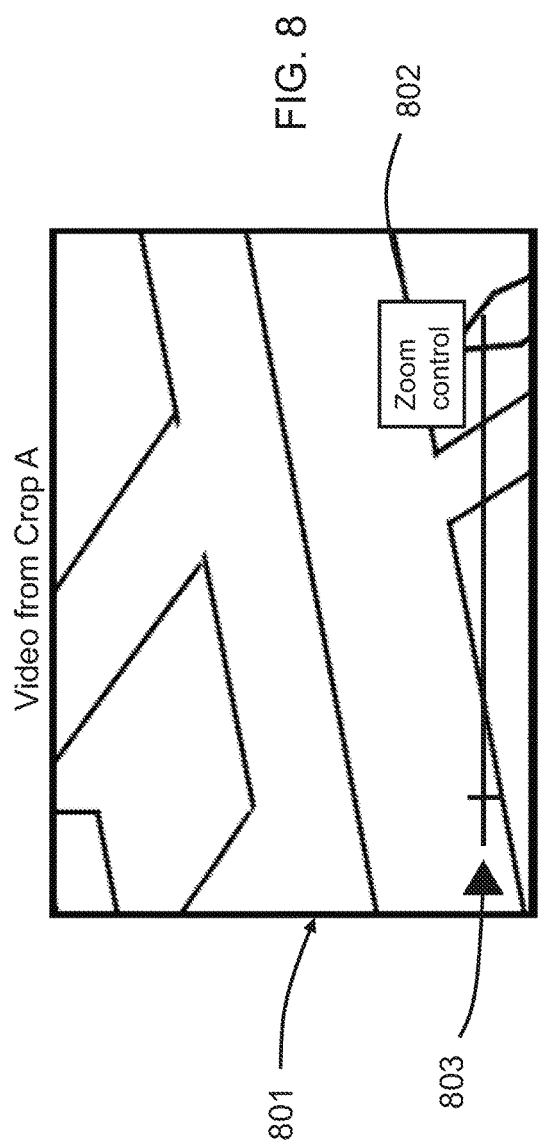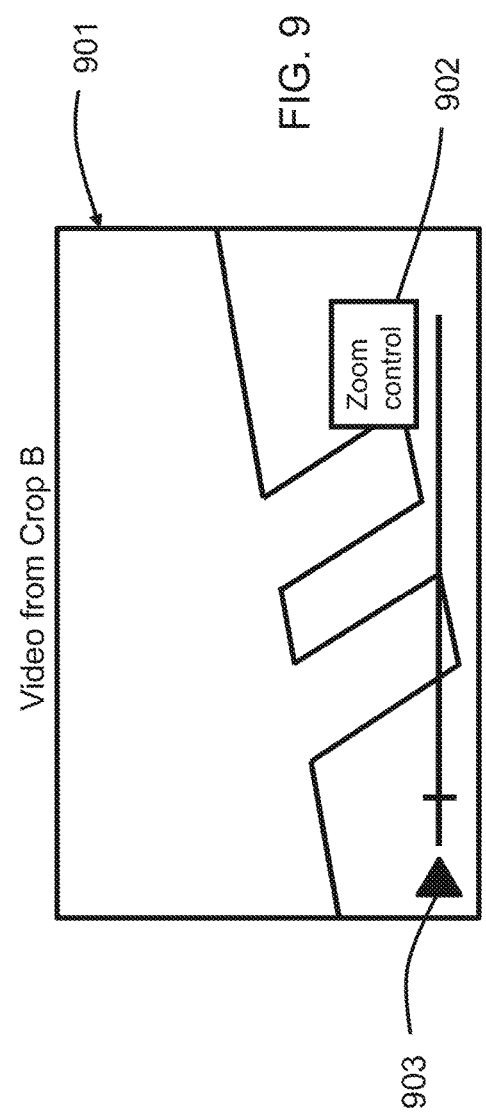

SYSTEMS AND METHODS FOR PROCESSING AND PROVIDING TERRESTRIAL AND/OR SPACE-BASED EARTH OBSERVATION VIDEO

TECHNICAL FIELD

The following relates generally to systems and methods for processing and providing video, and, in particular, systems and methods for processing and providing terrestrial and/or space-based Earth Observation video.

BACKGROUND

Video data is becoming more prevalent as camera technology evolves. Video data may include aerial videos taken from above, Earth or planetary observation videos taken from a vehicle in space, security or traffic videos taken from mounted cameras, personal videos taken by users, or even videos created using computer graphics. Commercial movies may also be considered videos.

Users wish to obtain and watch videos. The controls associated with watching a video typically include controls for playing and stopping the video, changing the pixel image quality of the video, and increasing or decreasing the screen size to be "full screen" or to fit within a certain sized video player window.

A user may watch the video and then, if the user likes the video, may download the video.

BRIEF DESCRIPTION OF THE DRAWINGS

Embodiments will now be described by way of example only with reference to the appended drawings wherein:

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 8 is an example screen shot of the isolation of the first crop area;

FIG. 9 is an example screen shot of the isolation of the second crop area;

FIG. 12 is an example screen shot of the main window where an available product is selected;

FIG. 17 is an example screen shot of the main window where the processing of the cropped videos has completed;

DETAILED DESCRIPTION

Figure 1:
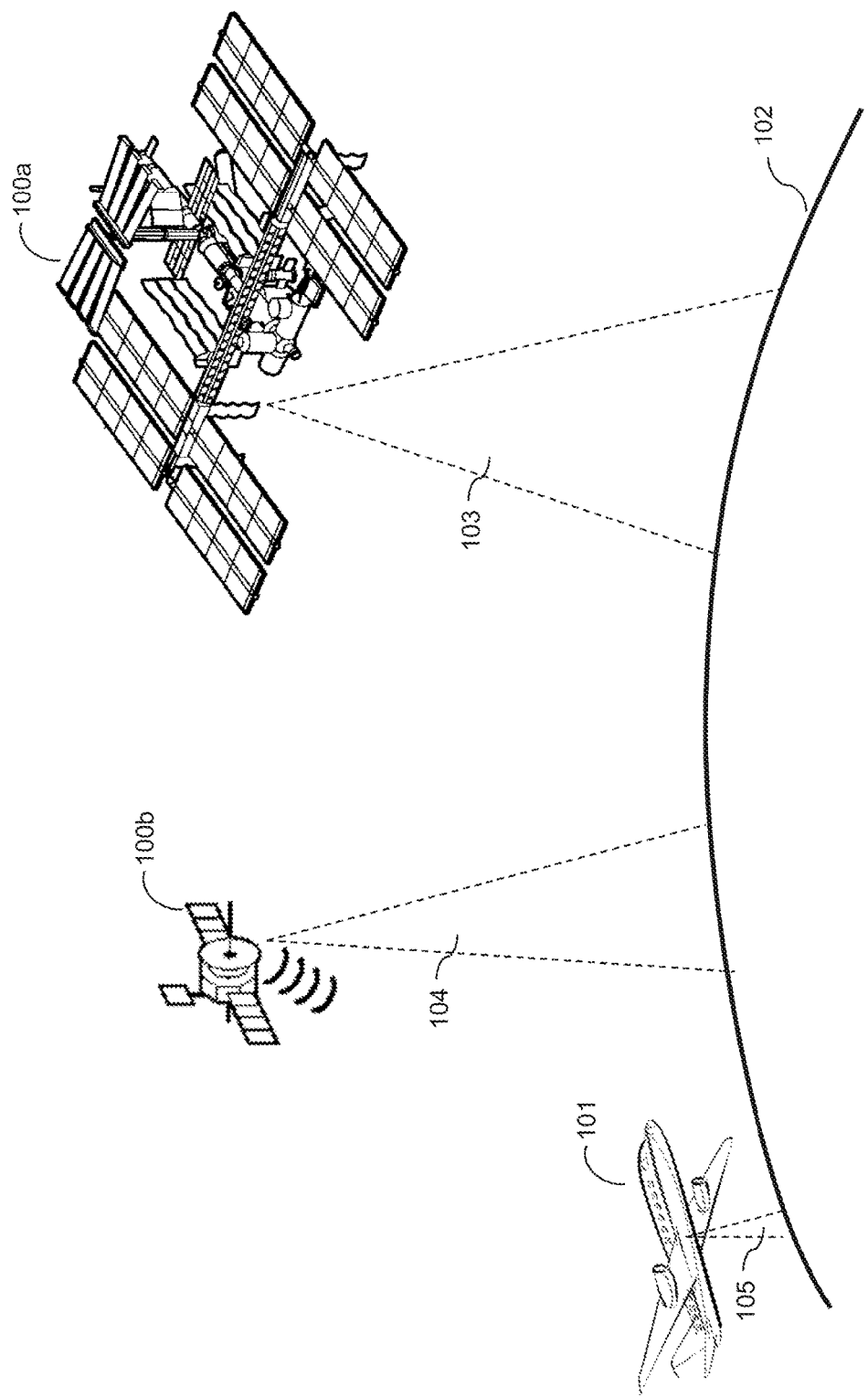
FIG. 1 is a schematic illustration of spacecraft and aircraft collecting observation data of the Earth.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The Abstract of the Disclosure provided herein is for convenience only and does not interpret the scope or meaning of the embodiments.

The amount of video data is growing. More locations and areas are being video recorded and from different angles. The length of video recordings grows longer. More people are creating new videos using cameras, video editing technology, computer graphics technology, or combinations thereof.

End users may only find certain portions of the available video data to be relevant or interesting and may wish to separate the interesting portions from the non-interesting portions. The portions may be based on a certain position or area, or both, within a video. There are a lack of tools or lack of convenient tools for an end user to isolate an interesting portion of a video and to generate a new video based on the isolated portion of the video.

When an end user finds multiple different portions within the same video to be of interest, there is a lack of tools or lack of convenient tools for an end user to isolate these portions and generate multiple videos from these isolated portions. It is also recognized that keeping track of the different portions of interest within the same video is difficult. For example, an end user may accidentally generate isolated videos of the same portion or that are substantially overlapping of the same portion. This may create extra data, incur excess video processing load, and may incur unneeded costs if costs are associated with the generating of each isolated video.

Before downloading a video, an end user may like to preview the video of interest. Previewing an isolated video in isolation may not be helpful to the end user and providing meaningful context for the isolated video may be difficult.

These difficulties are also magnified when attempting to view video covering large areas, such as Earth Observation videos or security videos, etc. When viewing video covering a large area of land, and when focusing in on a specific area or portion, it may be difficult to identify the specific area or portion without context. The process of isolating or cropping portions to generate new cropped video would also be more difficult for an end user. Consider, for example, video imagery of a city, a desert, a body of water, a mountain range and a forest. Such landscapes may be overly crowded with detail or the imaged detail may appear to be uniform throughout the video's field of view and, as such, identifying a smaller portion of the landscape in isolation would be made more difficult.

When an end user has ordered, purchased or requested video data, it is difficult to keep track of the ordered video data when there are many video data orders. Typically, video data ordering systems do not provide tools to view the status of video orders, to view the context of the video orders (e.g. location), and to view the context and status of derivative video imagery based on original video orders. The lack of one or more of these tools makes it difficult for an end user to manage their video data.

The systems and methods described herein allow a portion of an area of a video to be isolated, also called "cropped", to create an isolated or cropped video. The cropped video is shown in context of the original video from which it was derived. The systems and methods described herein also facilitate previewing cropped video data.

The systems and methods described herein also provide a user interface, also called a portal, that provides user actuatable controls to download video data, displays the status of video data orders, and displays information that shows the context of the video data (e.g. geographical and date information). The portal also shows derivative video data, such as cropped video, in context of the original video.

The following are example meanings of some of the terms used in this document.

An 'order' refers to a request for a set of products/services on which the systems described herein will act. An order may be, for example, for video data.

Video data comprises imaging data, the imaging data comprising a plurality of temporally sequential frames of images that were captured at one or more frequencies in the electromagnetic spectrum (for example, in the visible, near infra-red, infra-red, radar, and microwave portions of the electromagnetic spectrum).

'Original video data' refers to video data that is available to be viewed or downloaded, or both, by an end user's device, also called a client device or end user device. The original video data includes a series of frames, and each frame an array of pixels that define an area of the original video data. The original video data may specify a temporal sequential order for the frames, which correspond to a sequence of times when, or order in which, each frame was captured.

A 'cropped video' or 'cropped video data' refers to video data that has been derived from the original video data. In particular, a smaller area within the area of the original video data is defined and used to create the cropped video data. The smaller area includes an array of pixels that is a subset of the array of pixels in the original video data. The video frame size refers to the dimensions (expressed in pixels) of a frame in the video data. The cropped video covers a smaller area compared to the area covered by the original video data, and so the video frame size of the cropped video data is typically smaller than the video frame size of the original video data. The image information may not necessarily be stored as an array in a memory, but is presentable as an array (e.g., two-dimensional) of pixels. The cropped video may include the same number of frames as the original video data, or may include a different number of frames compared to the original video data. The cropped video may be at the same frame rate as the original video, or may be at a different frame rate. In some embodiments, a frame rate converter converts a video at the original frame rate into a video at a different frame rate. Example frame rates include, but are not limited to, NTSC/PAL/HD variants at 24/25/30/50/60 frames per second.

Turning to FIG. 1, example embodiments of various spacecraft 100*a*, 100*b* and an aircraft 101 are shown orbiting or flying over the Earth 102. The International Space Station 100*a* is an example of a spacecraft and it is able to use an imaging system to capture a field of view 103 of the Earth 102. Another spacecraft is a satellite 100*b* which can use an imaging system to capture a field of view 104 of the Earth 102. It can be appreciated that other types of spacecraft, including rockets, shuttles, satellites, microsatellites, nanosatellites, cubesats, and capsules, and generally spacecraft are herein generally referenced by the numeral 100. Aircraft 101, including airplanes, unmanned aerial vehicles (UAVs), helicopters, gliders, balloons, blimps, etc., can also be equipped with an imaging system to capture a field of view 105 of the Earth 102. It can also be appreciated that marine vehicles (e.g. boats, underwater vehicles, manned vehicles, unmanned vehicles, underwater or above-water drones, etc.) can also be equipped with sensing technology and this sensor data can be obtained, managed and processed using the principles described herein.

Although Earth is used as an example in this document, the principles described herein also apply to remote sensing operations for other planetary objects. Non-limiting examples include asteroids, meteors, Mars, the Moon, the Sun, etc.

It can be appreciated that spacecraft 100 and aircraft 101 orbit or fly at a distance above the Earth's surface to capture larger area of the Earth's surface. It can also be appreciated that the principles described herein are described with respect to spacecraft, but the principles also apply to aircraft.

In an example embodiment, the spacecraft 100, such as the International Space Station 100a, is equipped with several cameras (not shown). The cameras are pointed towards the Earth's surface to capture images of the Earth's surface. In an example, one camera is a Medium Resolution Camera (MRC) that has a larger field of view and another camera is a High Resolution Camera (HRC) that has a smaller field of view relative to the MRC. The spacecraft 100 may also be equipped with another camera that points towards the horizon of the Earth. The spacecraft 100 may include an additional camera that point towards space, away from the Earth, which can capture video images of space.

Each video frame can have a series of spectral bands that can be leveraged to provide video that is rich in spectral and spatial content about an area of interest. For example, in the case of the HRC, the video data can include Red/Green/Blue (RGB) and Near Infra-Red (NIR) data, and a False color NIR video can be processed and provided for the area of interest.

It will be appreciated that although the principles described herein apply to aircraft 101 and spacecraft 100, it is recognized that a spacecraft 100 is able to orbit the Earth. In other words, a spacecraft 100 is able to cover large areas of the Earth more efficiently than an aircraft 101.

It will also be appreciated that although cameras and imaging systems are often described herein to observe the Earth, other types of sensors can be used to observe the Earth. Many of the principles described herein also apply to different types of sensors. Non-limiting examples of other types of sensors that can be used to observe the Earth include LiDAR, RADAR, infrared sensors, and Synthetic Aperture RADAR (SAR). Other types of remote sensing technology may also be applicable. In other words, video data may be, or may include, other types of data, not limited to imaging of the visible light spectrum.

Figure 3:
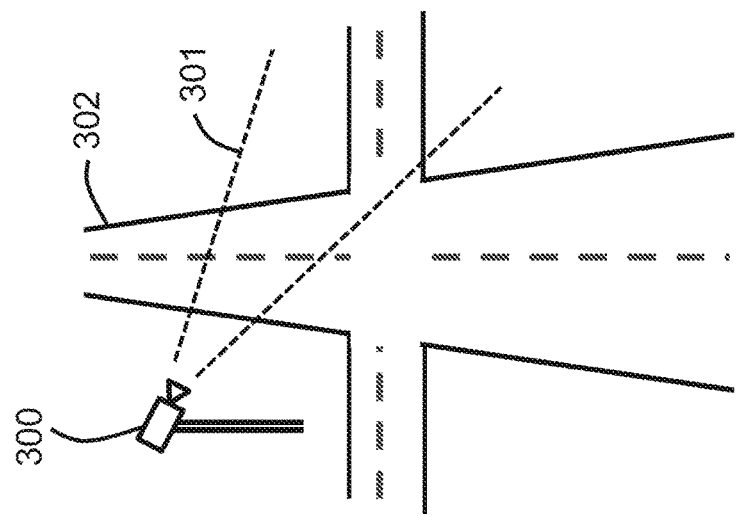
FIG. 3 is an example schematic illustration of a traffic camera collecting observation data of an intersection.
Figure 2:
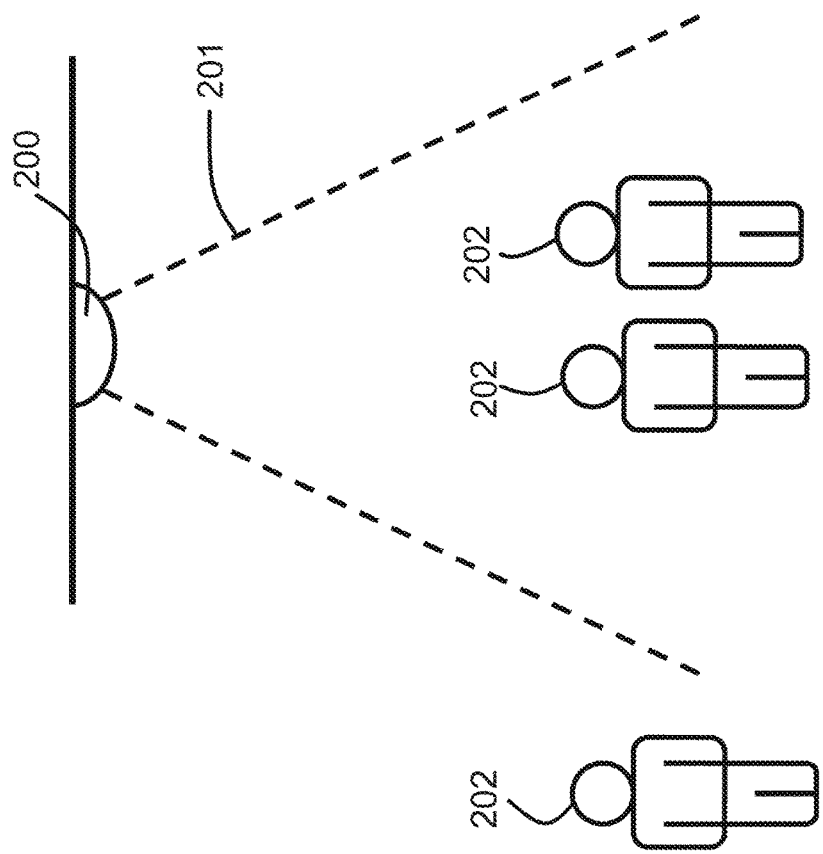
FIG. 2 is an example schematic illustration of a security camera collecting observation data of people.

The techniques and systems described herein apply to video data from ground-based camera and imaging systems. Turning to FIG. 2, a security camera 200 is mounted on a wall, ceiling, car, blimp or lighter-than-airship, post, or other object. The security camera has field of view 201 that captures images, such as video data, of people 202. Similarly, turning to FIG. 3, a traffic camera 300 is mounted or positioned so that its field of view 301 captures video data or images of one or more roads 302. Other types of camera and imaging systems may be applicable to the principles described herein.

In a preferred example embodiment, the video data are images of locations. Locations may be, for example, of landscape, a cityscape, and an indoor place. However, the video data may be or also include other types of images, such as computer generated or enhanced images and graphics.

Figure 4:
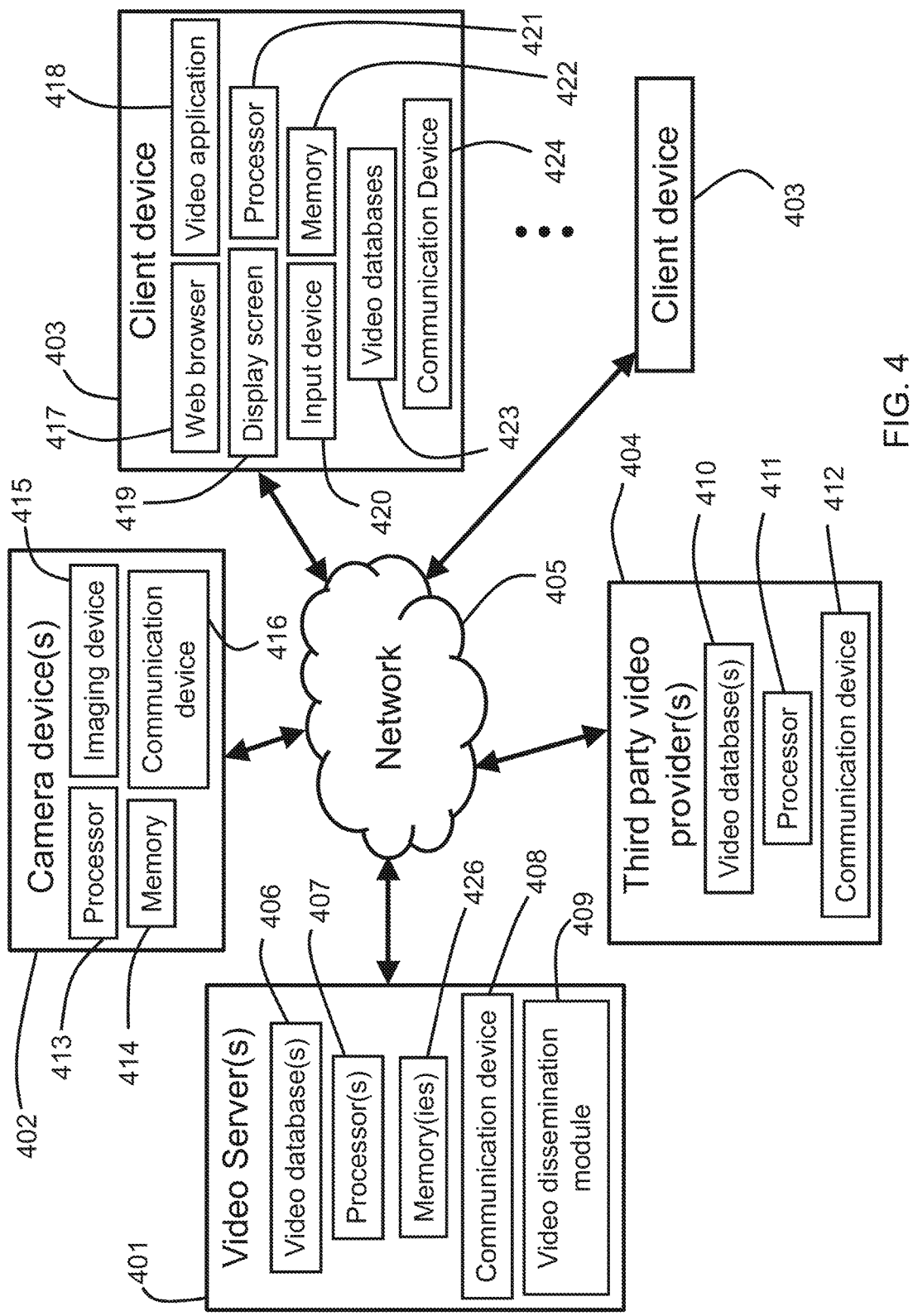
FIG. 4 is an example block diagram illustrating the connectivity between components within the video recording system.

Turning to FIG. 4, an example system 400 is shown for disseminating video data. Example components in the system include one or more video servers 401 communicatively coupled or coupleable to one or more client devices 403, for example via a data network 405. Optionally, one or more camera devices or camera systems 402 and one or more third party video providers 404 are part of the system and are communicatively coupled or coupleable with other components in the system, including, but not limited to, the one or more video servers 401. It will be appreciated that there may be multiple instances of such system components, although this document may herein refer to such system components in the singular.

A video server 401 includes one or more nontransitory computer-readable media that stores video databases (nontransitory computer-readable media and video database(s) collectively 406) for storing video data. The video server also includes one or more processors 407, and one or more processor-readable media (e.g., memory, ROM, RAM, Flash) 426 that stores at least one of processor-executable instructions and/or data. The at least one processor is communicatively coupled or coupleable to the nontransitory computer-readable media that stores video databases 406 as well as communicatively coupled or coupleable to one or more processor-readable media that stores at least one of processor-executable instructions and/or data. The at least one processor executes the processor-executable instructions and/or data which cause the at least one processor to disseminate video, as described here. The video server 401 may also include a communication device 408 that provides communications between the video server and the data network 405. The video server 401 may also include or implement a video dissemination module 409, for example implemented via execution of stored processor-executable instructions and/or data by one or more processors. The video dissemination module 409 provides user interface tools and displays to interact with video data stored as part of the database 406. The user interface tools, for example, include downloading controls, video preview controls, zoom controls, search controls, video data navigation controls, and video cropping controls.

The display data provided by the video dissemination module 409 includes location information associated with video data, video data orders for a given end user or party, the date the video data was created or captured, the processing status of the video data and available actions of the video data. The display data may also include a map showing the locations of the video data and associated notifications. For example, the notifications may be specific for an end user and an indicator may show the number of unread notifications about new imagery of video captured, processed, or ordered, or any combination thereof, for that end user. The video dissemination module 409 also processes video data and generates derivatives of video data, including cropped videos.

A client device 403 executes a web browser or Internet browser 417, or a video application 418, or both, to gain access or interact with the system 400. The browser 417 is used to display a website provided by the video server 401. Alternatively, or in addition, a video application 418 on the client device 403 includes executable code for displaying user interface controls and processing inputs and data. The video application 418 interacts with the video server 401. The client device 403 also includes, or is communication with, a display screen 419 and one or more user input devices 420. Non-limiting examples of user input devices include a mouse, keyboard, keypad, track pad, trackball, joystick, touch interface, wand, motion tracking apparatus, head tracker, eye tracker, etc. The client device also includes memory 422, one or more nontransitory computer-readable media that stores one or more video databases 423, and a communication device 424 communicatively coupled or coupleable with the data network 405. Non-limiting example embodiments of a client device include a personal computer, a desktop computer, a laptop computer, a mobile processor-based device such as a smartphone, a tablet computer, an e-reader, a personal digital assistant, and a netbook computer.

The client device 403 is able to view orders for video data, download video data from the video server, and to send instructions to the video server 401 to generate cropped videos. Downloaded video data can be provided in a suitable video format. For example, for cropped video, HD/4KUHD format can be used, and the cropped video data can be encoded as specified by the end user or end user device or in a like manner to the original video.

A camera device or system 402 includes an imaging device 415, a processor 413, memory 414 and a communication device 416 communicatively coupled or coupleable with the data network 405. A non-limiting example embodiment of an imaging device includes an image sensor that operates in any one or more of a variety of portions or ranges of the electromagnetic spectrum. The camera device or system may be mounted on a spacecraft, an aircraft, a vehicle, a movable mount, or a stationary mount. The camera device or system captures video data and sends the video data to the video server 401 or to the third party video provider server 404, or both.

A third party video provider 404 is a computing system or server that includes one or more video databases 410, a processor 411 and a communication device 412 that is communicatively coupled or coupleable with the data network 405. The third party video provider 404 is configured to provide video data from the video database 410 to the video server 401.

In an example embodiment, a client device 403 is in communication with the video server 401 to obtain cropped video data. The video server 401 sends original video data or information about original video data to the client device 403. In return, the client device 403 sends commands and parameters, for example, based on user input, to generate a cropped video. In response, the video server 401 then generates the cropped video and then sends the cropped video or information about the cropped video to the client device 403.

As described above in reference to FIG. 4, a video dissemination service can be provided via example system 400. Example components in system 400 include one or more video servers 401 communicatively coupled or coupleable to one or more client devices 403, for example via data network 405. In another example embodiment, video dissemination module 409 can be provided to a client (or user) as a standalone tool. Original video data can, for example, be provided to the client by one or more video servers 401 via data network 405 or other suitable communication channel. The client or end user can operate video dissemination module 409 independently of video servers 401 to process video data and generate derivatives of video data, including cropped videos, without, in this example embodiment, having the derivatives disseminated via the data network. This approach can be beneficial to a client having security requirements, for example, and not wishing to communicate derivative videos via the data network or outside a firewall.

FIG. 5 through FIG. 9 show example screen shots provided or presented when generating and presenting a cropped video.

Figure 5:
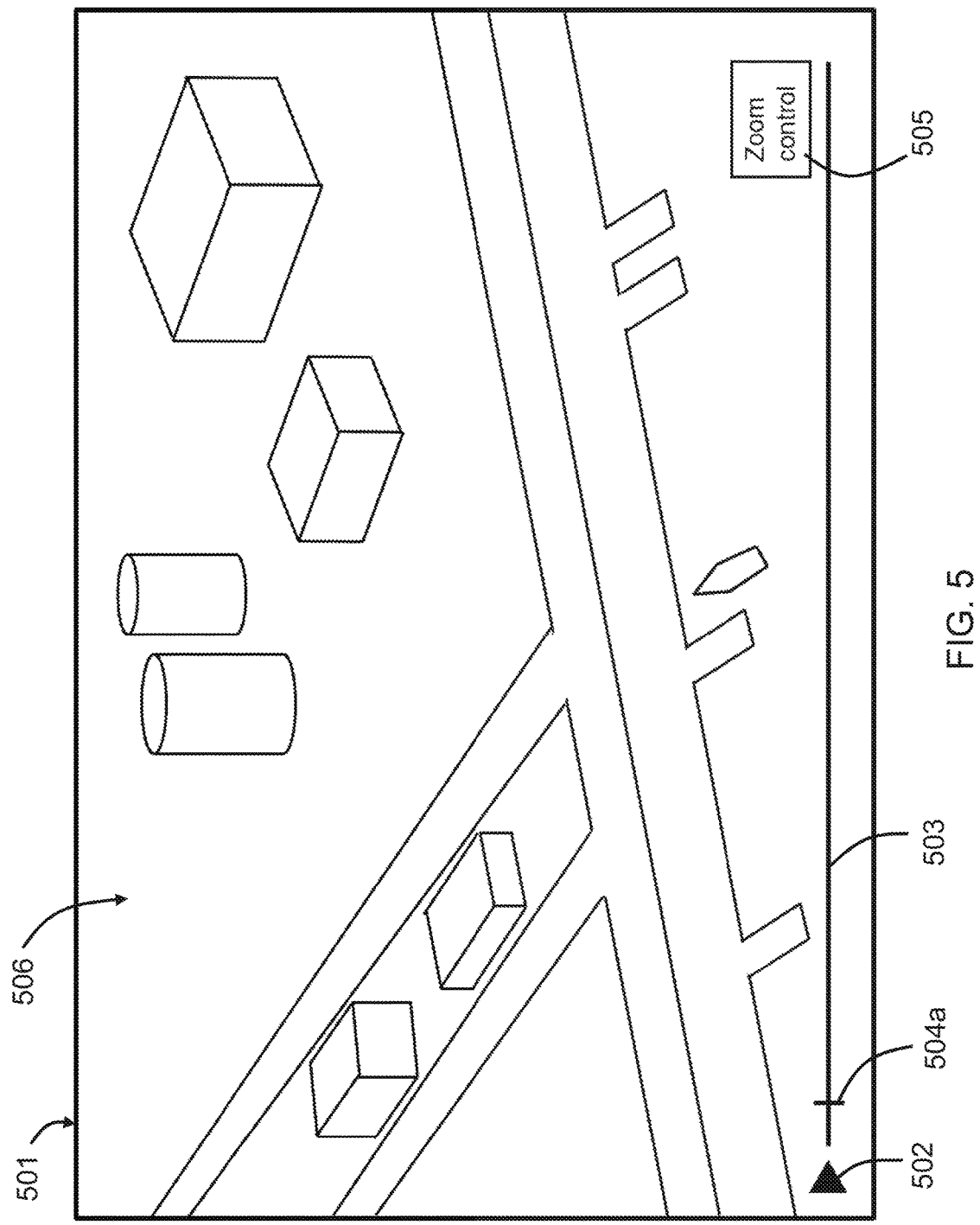
FIG. 5 is an example screen shot of a video captured by a video recording device along with at least a portion of a user interface having a time marker at a first setting.

FIG. 5 shows a video display 501 on a client device 403 (FIG. 4) of original video data, or video imagery, 506 provided by a video server 401 (FIG. 4). The original video imagery is an aerial view of roads, buildings, a shoreline with piers, and a boat, although could take any of a wide variety of other forms. The video display 501 includes a user selectable control graphical element or icon 502 to play the video, or to stop or to pause the video. A timeline graphical element 503 shows the length of video and a time marker 504a shows the current time of the video being displayed. As the video plays, the time marker 504a moves along the timeline graphical element 503 (e.g., left to right in the reference frame of FIG. 5). The time marker is generally referenced by numeral 504, but the suffixes 'a', 'b', etc. are used to indicate different time values for the time marker. The video display also includes a user selectable zoom control graphical element or icon 505, which the user can select and drag or otherwise interact with to zoom-in and zoom-out of the video.

In an example embodiment, the original video data 506 of FIG. 5 is displayed in a relatively zoomed-out mode, although the original video data can be shown in a relatively zoomed-in mode by adjusting or interacting with the user selectable zoom control graphical element or icon 505.

Figure 6:
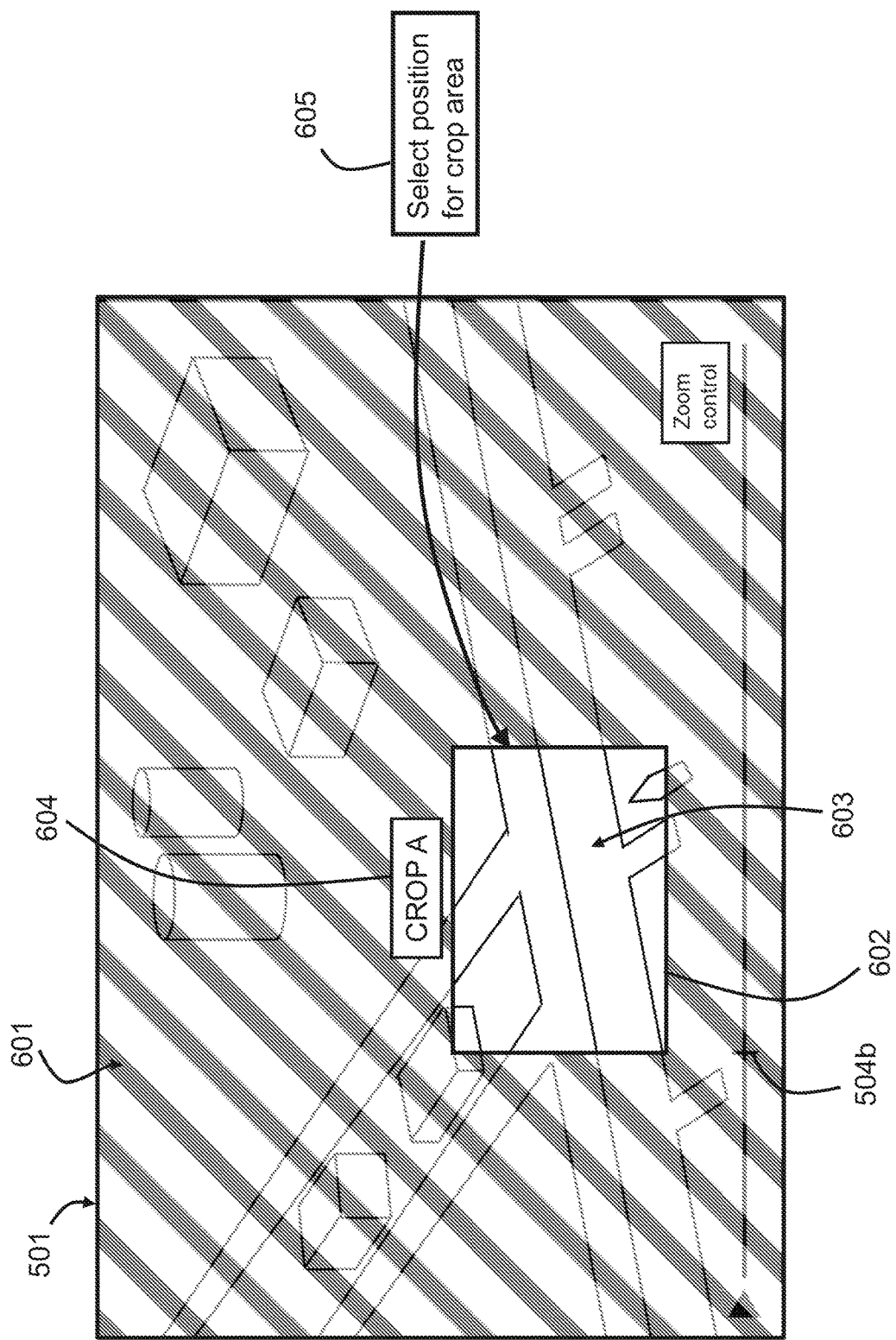
FIG. 6 is an example screen shot of a first crop area of a video captured by a video recording device along with at least a portion of a user interface having a time marker at a second setting.

Continuing from FIG. 5 to FIG. 6, a user provides one or more user inputs (e.g., action 605) using a user input device of the client device 403 (FIG. 4) to identify a portion 602 of the area of the original video data 506. The selected portion 602 is visually marked, for example by display of an outline. The system 400 (FIG. 4) uses the selected portion 601 to generate a cropped video, which is indicated with a tag 604 (e.g. "CROP A"). The remaining area 601 of the original video data, which is ancillary to the selected portion 602, may be identified, for instance visually obscured. For example, the remaining area 601 is visually obscured by applying a translucent grayed-out masking, or by applying shading, or by applying patterning. The area 603 within the selected portion 602 is not visually obscured, and maintains the clarity of the original video. In this way, the video display makes it clear to the end user what constitutes the content of the cropped video, based on the visually unobscured portion, in the context of the original video data, the remaining portion of which is visually obscured. In an alternative, or in combination, the outline of the selected cropped portion shown within the original video data also makes clear to the user what constitutes the content of the cropped video in the context of the original video data.

The outline of the selected cropped portion is known as the crop window. Example crop window 602 of FIG. 6 is illustrated as a rectangle with its sides parallel to the sides of the video display. Crop window 602 can be oriented at an angle relative to the sides of the video display. In other words, the axes of the cropped video can be rotated in the plane of the video display relative to the axes of the video display.

Typically, the video format, selected by the end user for the cropped video, defines the shape of crop window 602. In other examples, crop window 602 can comprise any suitable regular or irregular shape oriented at a suitable angle.

A user can select the portion 601 for the cropped video while the video is playing, or while the video is paused. It is noted that the time marker 504b is at a different position along the timeline than as was illustrated in FIG. 5.

Figure 7:
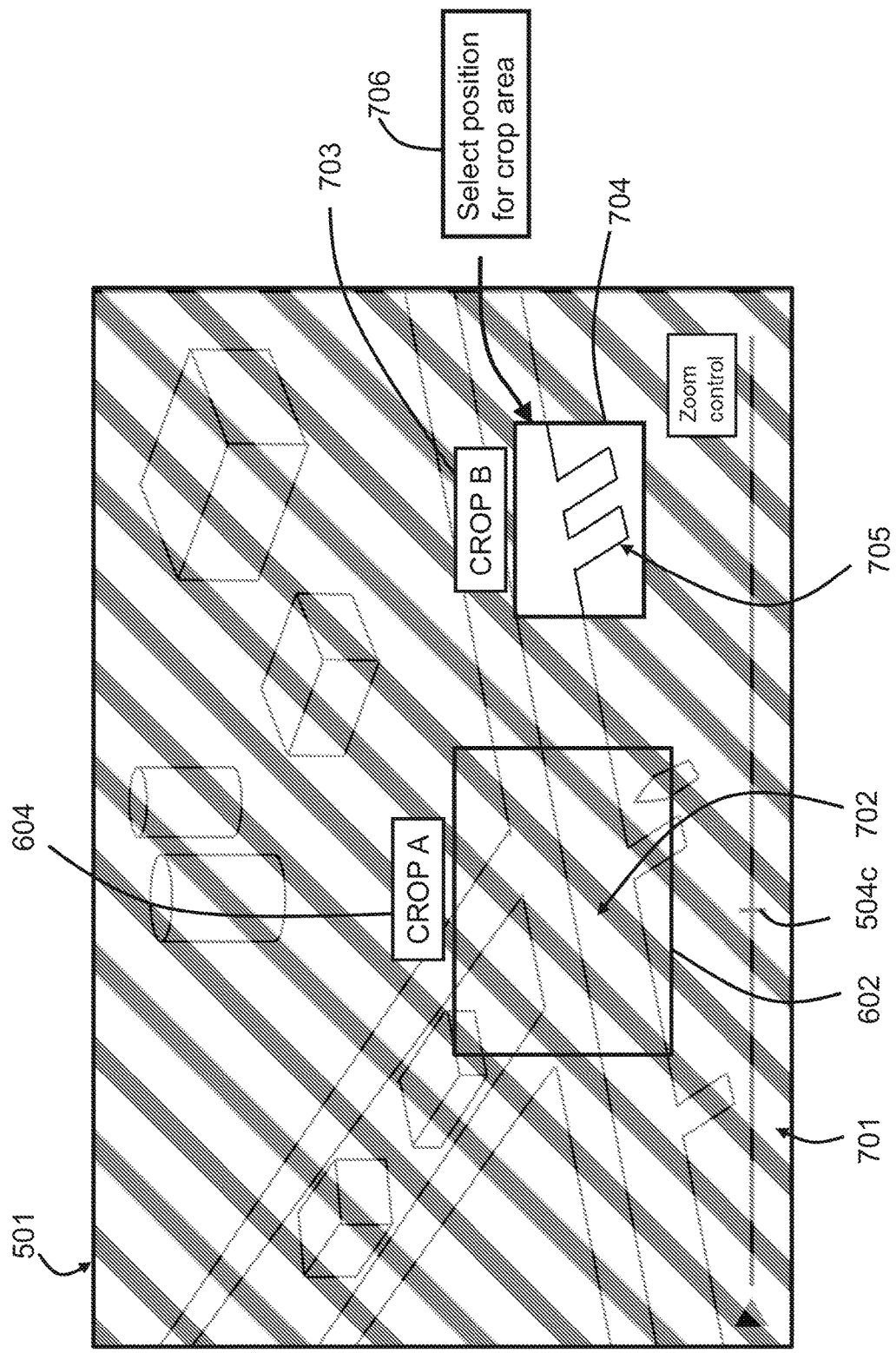
FIG. 7 is an example screen shot of a first and second crop area of a video captured by a video recording device along with at least a portion of a user interface having a time marker at a third setting.

Continuing from FIG. 6 to FIG. 7, another instance of the video display 501 is shown. A second selected portion 704 of the area of the original video data 506 has been identified, for example, based on user input provided through the client device 403 (FIG. 4) (e.g. action 706). The system 400 (FIG. 4) uses the second selected portion 704 to generate a second cropped video derived from the original video data. The system 400 (FIG. 4) generates a tag 703 (e.g. "CROP B") and causes the tag 703 to be displayed to identify the second selected portion 704. The area 705 within the second selected portion maintains the clarity of the original video data.

The remaining area of the original video data 701, including the area 701 of the first selected portion 602 is visually obscured. The outline of the first selected portion 602 and the corresponding tag 604 are persistently displayed in the context of the original video data, so that the positions and sizes of the first selected portion 602 and the second selected portion 704 are easily compared. In this way, there is less risk of generating cropped videos that are of the same portion areas of the original video data. It will be appreciated in FIG. 7, the time marker 504c is at a further position along the timeline than in FIGS. 5 and 6.

Turning to FIG. 8, the video server 401 (FIG. 4) outputs a derivative video 801 based on the first selected portion 602 (e.g. "CROP A"). The derivative video is a separate video such that, when displayed in a video display (such the video display 501), the display includes play and pause control 803 and a zoom control 802. The derivative video, or cropped video, covers a smaller area compared to the area covered by the original video data. Thus, the cropped video image may be displayed using a default zoom setting that is more zoomed in than the zoom setting of the original video data in the video display 501. As an example, the cropped video is the same length or duration as the original video data when presented at the same speed.

In an example, the cropped video is displayed and/or downloaded using a fixed zoom setting for the specific length of the cropped video. In another example, the zoom setting of the cropped video varies from a first segment of the cropped video to a second segment of the cropped video. The variation in zoom setting can be selected, for example, by the end user. The variation in zoom setting can be defined as a frame-to-frame zoom setting in the cropped video. The variation in zoom setting can be considered equivalent to a variation in the boundaries of an area of interest (AOI).

The zoom setting of the cropped video can vary at the same time as panning occurs, or without panning.

The zoom setting can vary the sampling rate of the cropped video. In the technology described in this application, zooming can include retrieving data from the original video data at a higher sampling rate and a higher spatial resolution (more resolving power) than the original video data sampled for presentation on the video display.

Similar to FIG. 8, turning to FIG. 9, the second derivative or cropped video 901 outputted by the video server is presented or shown on an end user device. The video 901 is based on the second selected portion 704 (e.g. "CROP B"). Control 903 for playing and pausing the video and control 902 for controlling the zoom setting are also provided in the presentation or display of the second derivative video.

Figure 10:
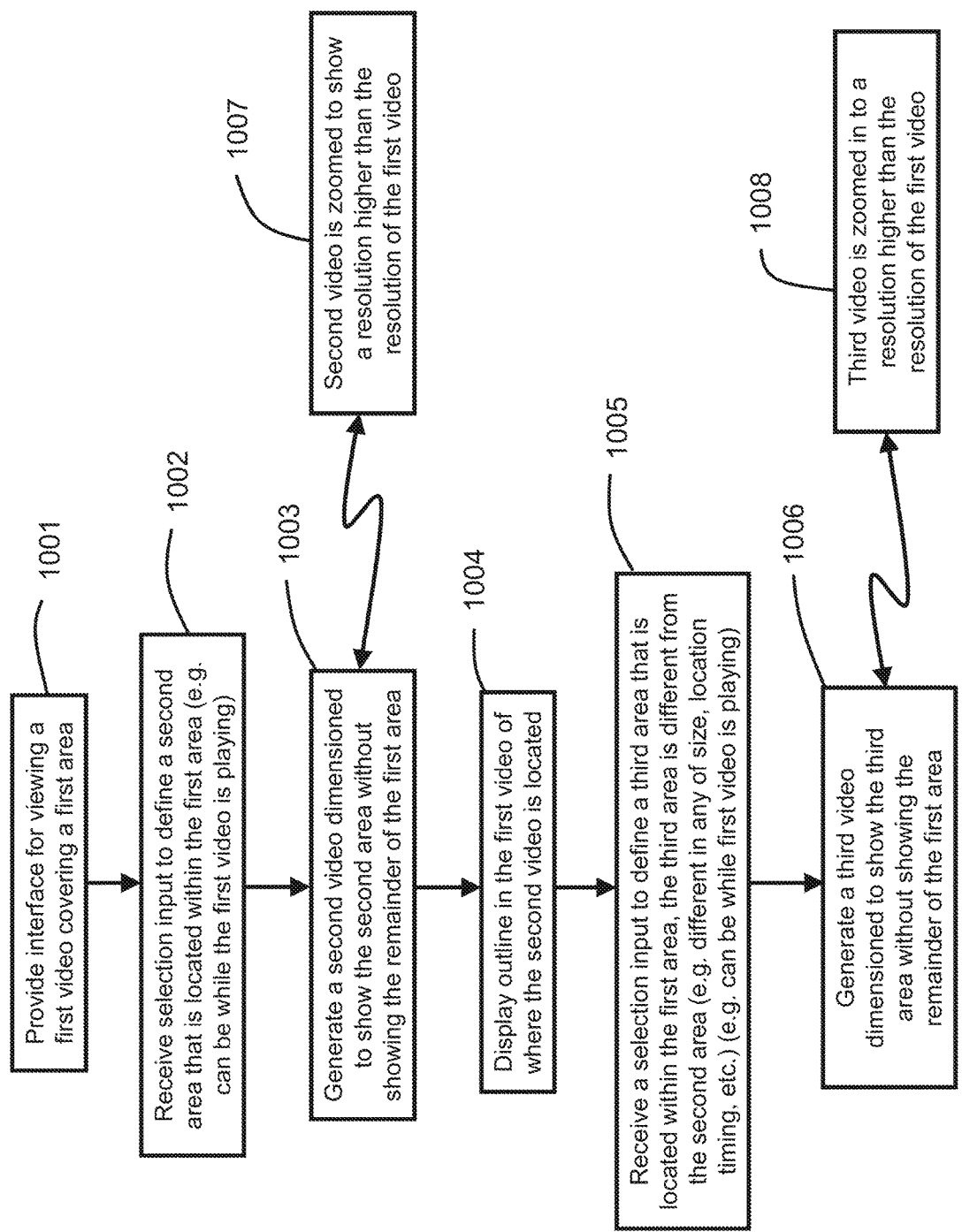
FIG. 10 is a flow diagram illustrating an example method performable by at least one processor that executes computer executable or processor implemented instructions for selecting and customizing crop areas.

FIG. 10 shows an example method of operation, performable by at least one processor that executes stored computer-executable or processor-implemented instructions to generate one or more cropped videos. The instructions, for example, are executed by one or more processors of a video server 401 (FIG. 4), or a combination of a video server 401 (FIG. 4) and a client device 403 (FIG. 4).

At block 1001, the video server provides a user interface for viewing a first video, or original video, covering a first area. At block 1002, the video server receives a selection input, or series of user inputs, to define a second area that is located within the first area. For example, the selection input can be received while the first video is playing, or while the first video is stopped, or is paused. At 1003, the video server 401 generates a second video, dimensioned to show the second area without showing the remainder of the first area.

In an example implementation of generating the second video at 1003, the second video is zoomed in to a default zoom setting that is higher than the zoom setting or resolution of the first video (at 1007).

Continuing from 1003, the video server generates or causes to be displayed an outline in the presentation of the first video, the outline indicative of where the second video is located (at 1004). For example, the video server may provide information to the end user device to cause the end user device to present various visual effects with, or superimposed on, the videos. For instance, the video server may provide information to the end user device to cause the end user device to present an outline encompassing a defined area, to obscure one or more defined areas, or to render opaque, translucent one or more defined areas, marquee a defined area or render other visual effects.

At 1005, the video server receives a selection input that defines a third area, the third area located within the first area, and the third area being different from the second area. For example, the third area is different from the second area based on any one or more of characteristics, for instance one or more of size, location, and timing. Other differentiating characteristics may also be applicable. The selection input to define the third area may be received while the first video is playing, or while the first video is paused, or is stopped.

At 1006, the video server generates a third video dimensioned to show the third area without showing the remainder of the first area. In an example implementation of generating the third video 1006, the third video is zoomed in at a resolution setting that is higher than the zoom setting used to display the first video. The higher zoom setting of the third video may, for example, be a default zoom setting of the third video, but can be changed by a user to a different zoom setting.

The above operations were discussed from the perspective of the video server. However, it is appreciated that, in another example embodiment, some of the operations may be performed locally on a client device. In an example embodiment, the user interface and video data are displayed using the web browser 417 on the client device. In another example embodiment, the user interface and video data are displayed using the video application 418 on the client device.

Allowing a selection input to be received for another area, within the first video, while the first video is playing provides greater context for the user when defining the other area and reduces the number of user input steps or actions required to define the other area. Consider, for example, that while the first video is playing, a user can watch the imagery of the first video change over time. An event may be interesting to the user at a certain location and a certain time in the first video. Once the location, or the other area, within the first video is found to be interesting by the user, the user can provide a selection input that defines the other area within the first video while the first video continues to play.

In other words, while the first video is playing, in one example, it is possible to invoke an instance of generating a cropped video using only a single user input to define the other area within the first video. In other examples, more than one user input is received before generating the cropped video of the other area.

In an example embodiment, an end user or a party makes an order for certain video data. When the original video data is ready for download, the customer or end user receives a notification of the same. Recognizing that the end user does not necessarily want to download the original video data once it is ready for download, the systems and methods described herein can be used by a client device to access and preview the original video data via a video dissemination portal. In an example, the original video data comprises a large volume of data unsuitable for downloading to the client device as a video data file, for example. In this case, the client device can access and preview the original video data via a video dissemination portal that streams the original video data to a video display.

The video dissemination portal provides tools to crop the video and produce derivative cropped video. The original video, image stack, and derivative crops can be downloaded from the video dissemination portal. The cropped video products are transcoded and delivered to the user for further previews of areas of interest (AOIs). The AOIs can be manually selected or automatically selected based on certain criteria. End users can download the source image stack and further analyze within their own tool chains from imagery stored in their account within the portal. If a customer has a cloud-data storage agreement with the video dissemination system described herein, all products including derived products (e.g. cropped videos) may be delivered to the customer's cloud-data storage account instead of directly to the user's device.

FIG. 11 to FIG. 18 are a series of screenshots sequentially showing different steps of an example operation via a user interface to disseminate video data and to generate derivative video data (e.g. cropped video). The user interface or interfaces shown are displayed on a client device using a web browser 417, according to a preferred example embodiment. However, the user interface or interfaces may alternatively be displayed using a video application 418 on the client device according to another example embodiment.

In an example embodiment, the user interface or interfaces shown in FIG. 11 to FIG. 18 are specific to a user account. In other words, when an end user logs into their user account, video data and associated metadata specific to the user account is provided. In another example embodiment, the user interface or interfaces are not specific to a user account.

Figure 11:
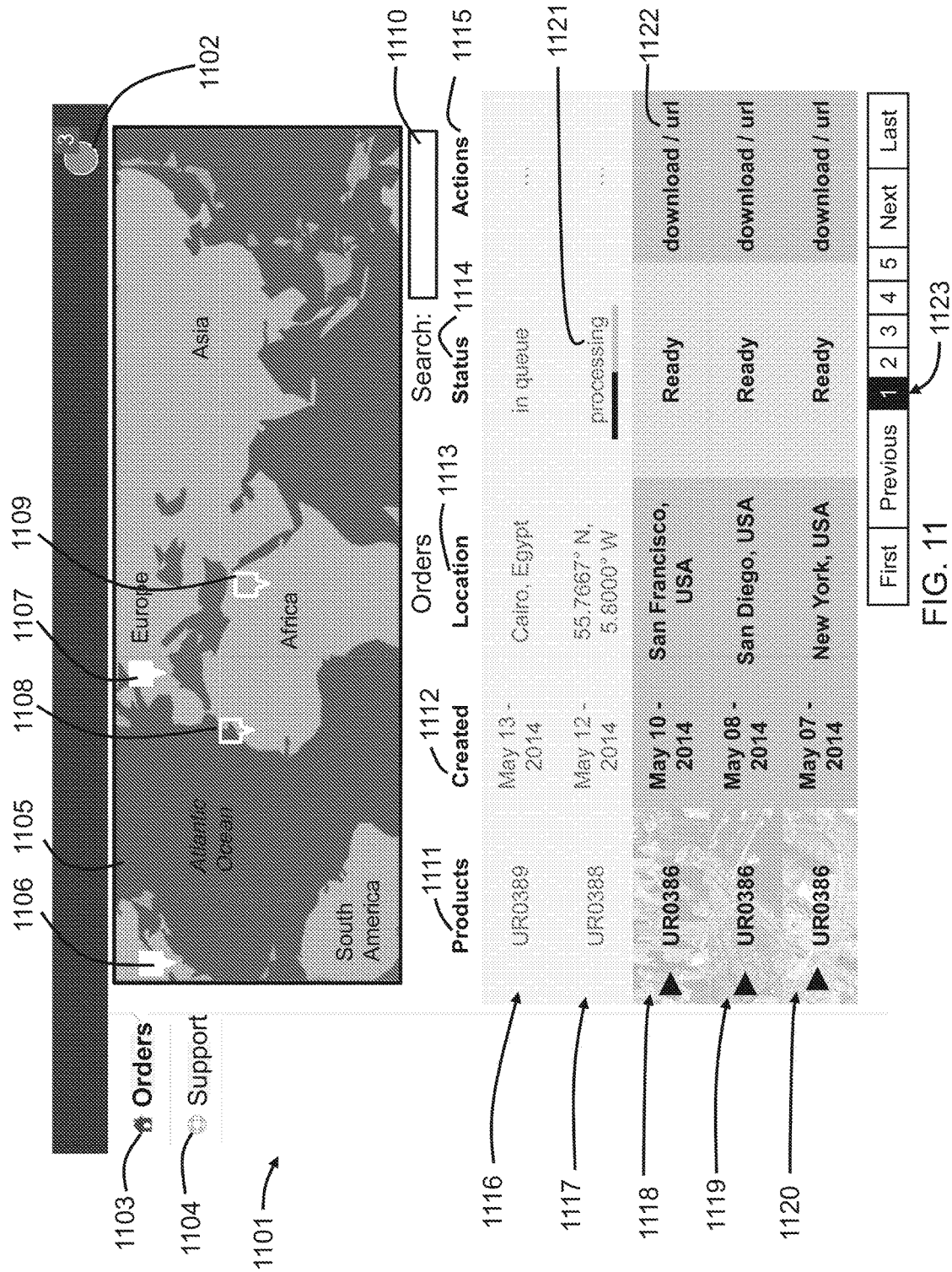
FIG. 11 is an example screen shot of a main window that includes user interface elements to select different available products.

Turning to FIG. 11, a user interface 1101 shows a video dissemination portal. The user interface 1101 shows video data products that have been ordered. A user selectable control graphical element or icon 1102 comprising an indicator is used to display a user profile photo with a callout of notifications pertaining to items related to video data products delivered or updated as shown in the interface 1101. For example, the number '3' represents the number of notifications the end user has that are unread in their inbox primarily, but not necessarily, about new imagery or video recently captured for that end user.

Tab control 1103 is provided to display the video data orders and tab control 1104 is provided to display support information and associated controls for supporting the use of the video dissemination portal. FIG. 11, FIG. 12, FIG. 16, FIG. 17 and FIG. 18 show different instances of the video dissemination portal when the orders tab control 1103 has been selected, either by default or by an end user.

The video dissemination portal also includes a map 1105 and location markers on the map identifying the locations of video data orders. For example, a video data order may be video images captured of the location, Cairo, Egypt. Accordingly, a user selectable location marker graphical element or icon 1109 is displayed on the map 1105 at Cairo, Egypt. Similarly, another video data order is of New York, United States, and a location marker 1106 is shown on the map 1105 at New York, United States. Other location markers on the map include those referenced as 1107 and 1108.

A location marker may also indicate the status of a corresponding video data order. For example, a video data order of Cairo, Egypt is not currently available for downloading. Accordingly, the user selectable location marker graphical element or icon 1109 for Cairo visually indicates that the video data order is not currently available. For example, the user selectable location marker graphical element or icon 1109 shows an outlined shape that is not filled-in. In another example, the user selectable location marker graphical element or icon 1106 for New York, United States visually indicates that the video data order of New York, United States is available for download. For example, the user selectable location marker graphical element or icon 1106 shows a shape that is filled-in.

A user-fillable search box or field 1110 is also provided to receive a search term inputted by an end user. For example, the search term is a parameter of a video data order, such as location, name, date of creating, status, etc. After a search term has been inputted into the search box or field 1110, a query is performed to identify video data orders that match the search term.

The video data orders are also displayed. Example headings or attributes of the video data orders that are displayed include a product name 1111, a date that the video was created or captured 1112, a location of where the video imagery 1113, a status of the video order 1114, and one or more actions that are available to be taken with the video order 1115.

A video data order entry field 1116, for example, shows a product name 'UR0389', a date of creating in May 13, 2014, the location of Cairo, Egypt, and an 'in queue' status. The 'in queue' status means that the video data order has been requested, but the video data order has not yet been processed and is waiting to be processed. As the video data for Cairo, Egypt is not ready or has not been processed, there are no actions available to be taken with this video data order. It is appreciated that the portal is configured to receive user input to customize or change the text for a product name.

A video data order entry field 1117 shows another product name, another date of creation, and a location of latitude and longitude coordinates. For example, the location is 55.7667° N and 5.800° W. In an example embodiment, the location column provides two types of representation, namely a location name and a set of location coordinates. The portal or user interface is configured so that, for example, based on user input, the display of the location name is toggled instead to showing the location coordinates, or vice versa. In another example embodiment, both types of data under the location heading are displayed simultaneously. In another example embodiment, the video server or the client application automatically switches back and forth between displaying the location name and the location coordinates. In another example embodiment, when a user clicks on the location cell in the table, the user input triggers the two types of location data to be displayed. The status of the video data order is represented as 'processing' in an order status field 1121, which means the video data order is currently being processed so that it will be available for download. The processing indicator in the order status field 1121 includes, for example, a visual indicator of the processing progress. For example, the processing progress indicator may be a bar that shows the percentage of the video data that has been processed and/or percentage to be completed. The processing progress indicator may also be represented as a pie chart, showing percent of completion to fully processing the video data, or may be represented as a number indicating the percentage of completion. Other indicators of progress may also be used. As the video data order 1117 is not ready or has not finished being processed, there are no actions available to be taken with this video data order.

In an example embodiment, the video processing involves retrieving a set of raw sensor imagery from the archive storage system and processing it into a high resolution video and or image stack. Raw sensor imagery is the imagery data captured by a sensor and stored in an archive storage system in association with raw ancillary data and other log (e.g. telemetry) data. The following formats are non-limiting examples of products that can result from processing: 3FPS radiometric corrected full resolution image stack; 25/30 fps full resolution stack; 25/30 fps 9072×6048 super resolution stack; HD/4KUHD (uncropped); HD/4KUHD (cropped); image stack dropped to URL; industry standard H.264.MP4/H.264.MOV in HD/4KUHD; video dropped to URL; status message to processing system via proprietary protocol; and image set and color reconstruction metadata.

In an example, another product format that can result from processing is UrtheTile with color corrected/matched tile metadata. An UrtheTile is a map tile encoded with data. More generally, the map tile is a file composed of compressed image of a certain pixel size. A non-limiting example size is 1024 pixels×1024 pixels. The file also includes N number of layer masks and a text metadata file. Other data included in the file, or data that is encoded in the map tile, includes, for example, spectral content, metadata and auxiliary information. Non-limiting examples of spectral content include near infrared (NIR) spectral content and red-green-blue (RGB) spectral content. The NIR spectral content and the RGB spectral content can be used, for example, to derive the Normalized Difference Vegetation Index (NDVI), which is also included in the map tile file. Non-limiting examples of metadata include the data source, the acquisition date and time of the data (e.g. video, photos, other sensor data, etc.), sensor characteristics, sun angles, and calibration parameters. Non-limiting examples of auxiliary information include a cloud mask, a snow mask, land/water mask, and missing data mask.

A central job queue system is used to hold information relating to the running and tracking of video processing jobs status and history and is accessed by all systems granted access to these web services. The central job queue system is typically implemented using a task management application, database, and message queue. The central job queue system is independent of any database or storage used to hold and archive imagery data.

Video data orders entries fields 1118, 1119, and 1120 each show a product name, a creation date, a location, a 'ready' status and available actions. The ready status means that the video data order has finished processing and is available for download. Accordingly, for a video data order that is ready, the available actions include downloading the video data and launching or obtaining a URL to the video data. User selectable graphical download elements or icons for triggering such actions are referenced by numeral 1122.

The video data order entries that are ready (e.g. 1118, 1119, 1120) also include a user selectable play button control graphical icon (e.g. represented as right facing triangle buttons or icons) in the user interface, that, when selected, triggers the video to be played in a preview mode. Furthermore, for video data that is ready to be downloaded, an image or one or more images from the video data is also shown in the user interface. When one or more images are displayed, they may be played one at a time, or may all be shown at the same time. The image or images helps to show to the end user the image contents of a given video. In an example embodiment, shown in FIG. 11, the image or images are shown as a background behind the product name. Other ways of showing the image or images may also be used.

It will be appreciated that video data order entry 1116 for Cairo, Egypt corresponds with the user selectable location marker element or icon 1109 and the video data order entry field 1120 for New York, United States corresponds with the user selectable location marker element or icon 1106. In general, each video data order entry is represented by a corresponding location marker on the map 1105.

User selectable navigation controls 1123 are also provided for viewing other video data order entries. The navigation controls 1123 include a user selectable icon to go to the first page, a user selectable icon to go to the previous page, a user selectable icon to go to the next page, a user selectable icon to go to the last page, and one or more user selectable icons to go to directly to a specific page.

Figure 12:
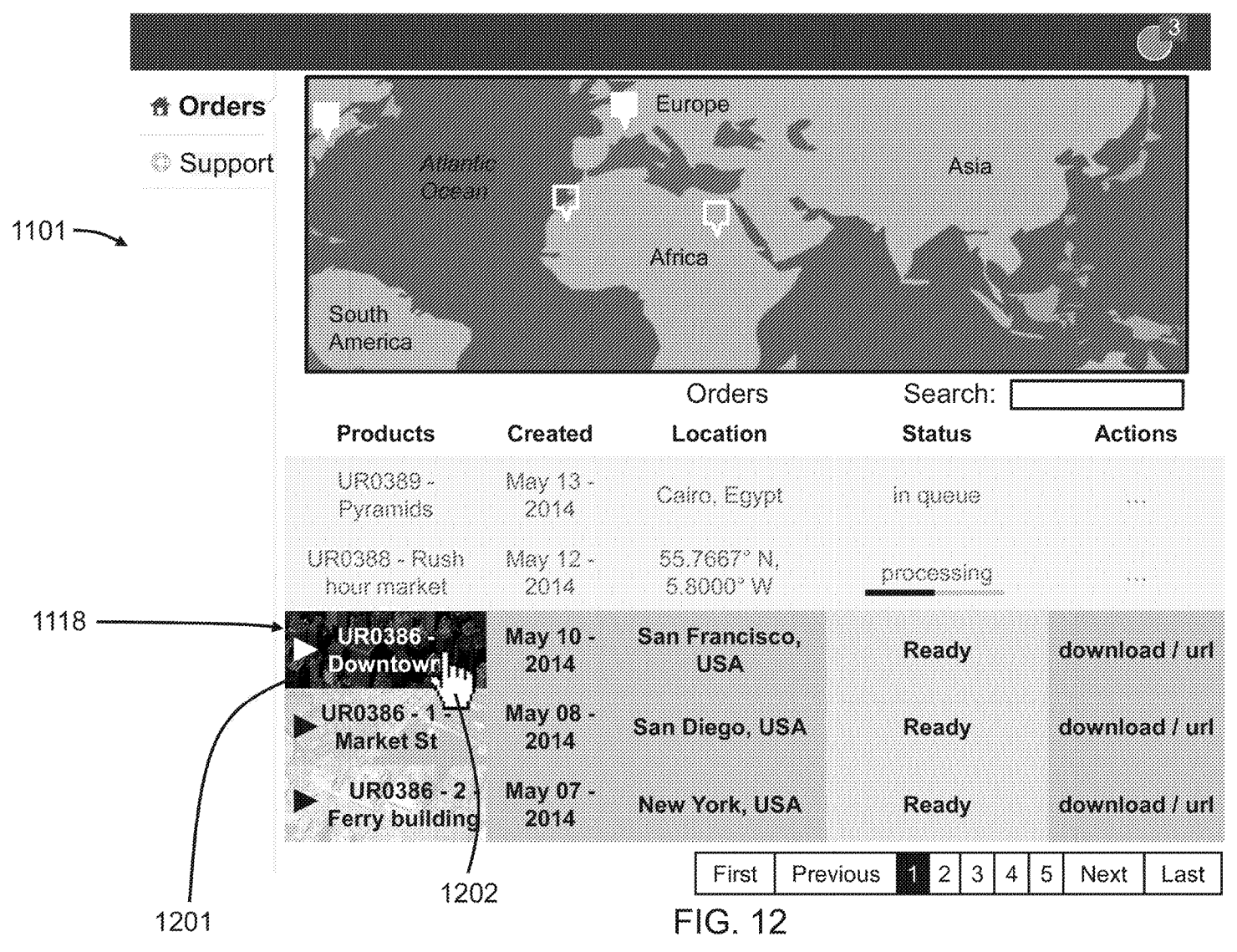

Turning to FIG. 12, another instance of the video dissemination portal 1101 is shown. A selection tool, cursor, or pointer 1202 is used to select the video data order 1118 showing video data imagery of downtown San Francisco, United States. The product name box or field 1202 for the video data order 1118 is visually highlighted or emphasized to show that it is being selected. Selecting the product name box or field 1202 launches a video player for playing the ordered video data of downtown San Francisco.

Figure 13:
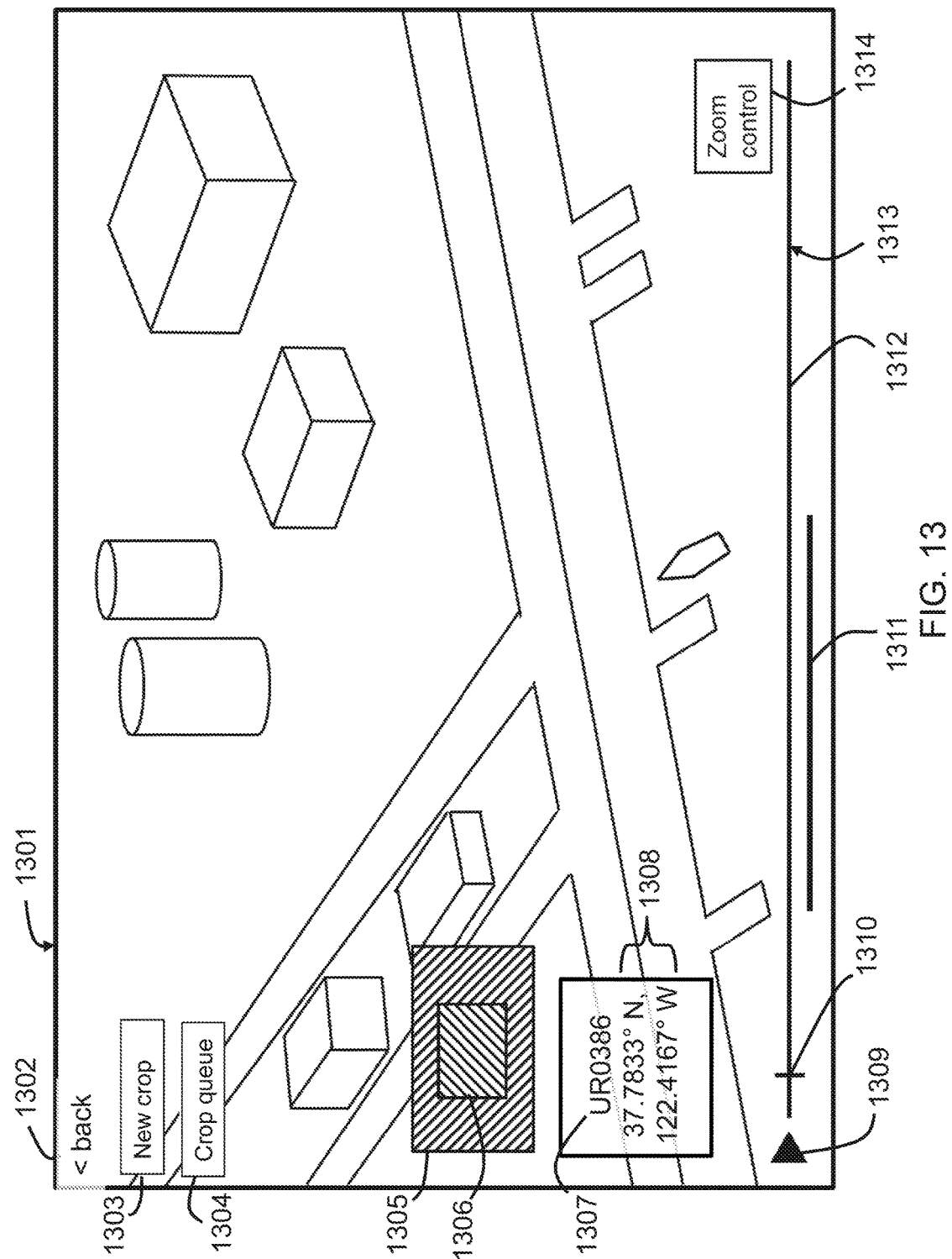
FIG. 13 is an example screen shot of a video of a selected product along with at least a portion of a user interface having a zoom control.

As a result of the input received at FIG. 12, the video player interface 1301 is caused to be displayed, as per FIG. 13.

The video player interface 1301 shows an example of a video of a downtown city or area of interest. A user selectable 'back' control icon 1302 is configured to display the video dissemination portal 1101 again, when the 'back' control icon 1302 is selected. A user selectable control icon 1309 is used to start playing the video, or to stop or pause the playing of the video, for example toggling through the options. A timeline marker icon 1309 is also displayed along a video timeline 1313. The timeline marker icon 1309 is used to indicate the current video image being played in the context of the entire length of the video. A portion of the timeline 1311 is in one color or pattern to show which portion of the video is currently processed for immediate previewing and playing. Another portion of the timeline 1312 is in another color or pattern to shown that another portion of the video is not currently processed for immediate previewing and playing. In an example embodiment, the processing used in this previewing scenario refers to buffered video data. The portion 1311 refers to the buffered video data. The timeline marker icon 1309 may be manually moved along the timeline 1313 to pan the video imagery.

A user selectable zoom control icon 1314 is also included to allow the end user to change the zoom settings. In an example embodiment, one zoom setting is to fit the entire screen, while another zoom setting is to fit the video imagery in a window of the web browser 417 or in a window of the video application 418. The zoom setting may also be based on numerical values, such as percentage values.

The inset image graphical element 1305 shows the entire area covered by the video image. A further inset box graphical element 1306, which is inset within the inset image graphical element 1305, shows the current area being displayed in video display 1301 based on the current zoom setting. In other words, the video image currently being displayed in the interface 1301 is at a zoomed-in setting and only shows a portion of the available area, as indicated by the inset image graphical element 1305 and the inset box graphical element 1306. When the video image in the interface 1301 is zoomed-out fully, the inset box graphical element 1306 would be the same size as the perimeter of the inset image graphical element 1305. It will be appreciated that, for example, the zoom setting currently shown for the video 1301 can be further zoomed in to show a closer look at the cityscape.

In an example embodiment, the inset box graphical element 1306 is used as a user selectable control to determine which location portion of the overall video area 1305 is to be displayed in the video display interface 1301. In other words, the location of the inset box graphical element 1306 can be moved by a user within the outline of the inset image graphical element 1305 to select a location of the video image to be displayed in the interface 1301.

The name of the video 1307 and the location that the video represents 1308 are also displayed in the interface 1301. The location can be identified as an address, a city, an intersection, a region, or by latitude and longitude, and indicates the location at which the image was captured. The time of day and the date that the video was taken or images captured may also be shown.

The user interface includes a user selectable new crop control icon 1303 selection of which launches a cropping tool to generate a cropped video. The user interface includes a user selectable crop queue control icon 1303, selection of which causes a display of a list of cropped videos generated or derived from the current video data, for which the end user may choose.

Figure 14:
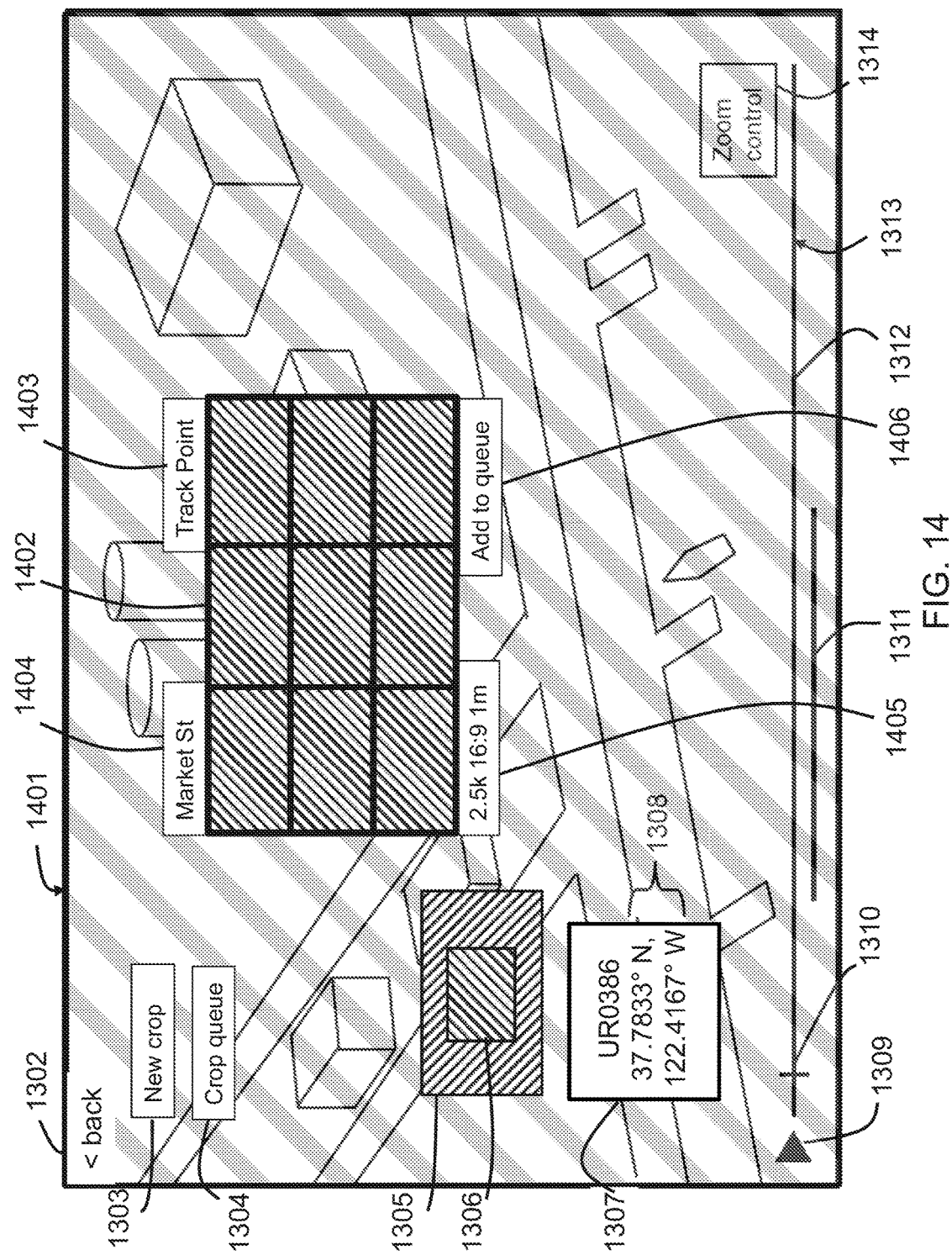
FIG. 14 is an example screen shot of a video of a selected product where a crop area is selected.

Turning to FIG. 14, when the cropping tool is activated, within the first area of the displayed video interface 1401, a second area 1402 may be defined using the cropping tool. For example, the cropping tool is used by the end user to draw a box defining the second area 1402. The cropping tool may, for example, operate using a select-drag-and-release operation. In particular, a first position in the video interface 1401 is selected using a pointer of a cropping tool; the pointer is dragged to a second position in the video interface 1401; the pointer is released; and a box outlining the second area, having two diagonally opposing points defined by the first and the second positions, is created or displayed.

In another example, the cropping tool is used to define a point in the video, and a box or perimeter having another shape is displayed around the point according to a default shape and size. The shape or size, or both, can then be manually adjusted.

In another example, two points in the video 1401 are selected, which are used to display a box of the second area 1402 having two diagonally opposing corners defined by the two selected points.

It will be appreciated that other ways to define the second area 1402 can be used.

A name tag field 1404 displays a name tag identifying the cropped video. A display and control field 1405 is used to display information or parameters about the proposed cropped video.

Ground Sampling Distance (GSD) commonly refers to the pixel size (projected onto the ground) as originally sampled (or imaged). GSD varies with altitude as well as the 'look angle' of the sensor, where nadir imagery exhibits the smallest GSD and obliquely acquired imagery exhibits a larger GSD. GSD will vary within the image depending upon the terrain and position within the field of view.

Spatial resolution is a more general term and, in the present context, refers to any re-sampling of the original imagery. Spatial resolution may reflect the GSD simply resampled to a finer (smaller) or coarser (larger) sample distance. Spatial resolution is usually interpreted as constant within an image (and is often reported as a single value for a given image) and thus is inferred to apply to the entire image. As a result, spatial resolution has a more precise meaning with Orthorectified images where GSD has been normalized throughout the image, rather than with Camera View (perspective) images where both GSD and spatial resolution vary throughout the scene.

Non-limiting example types of information or parameters that can be provided via the display and control field 1405 include the pixel resolution (e.g. 1920×1080 pixels), the aspect ratio (e.g. 16:9), and the spatial resolution (e.g. 1 meter). The display and control field 1405 is also configured to adjust the parameters of the cropped video. For example, a user may edit a displayed value to a new value, causing an automated updating of the cropped video.

A track-point control icon 1403 is used to indicate whether a point in the video is being tracked. The video display user interface directly correlates pixel values with geospatial latitude and longitude coordinates. A point or object in the user interface can then be tracked in a geospatial context which corresponds to the point or object in motion. When the track-point control icon 1403 is selected or activated, either by default or manually selected, the point is followed or tracked. In other words, the size of the second area remains the same while the location of the second area moves based on the location of the given tracking point.

The user interface may include a user selectable new parameters control or icon 1406, selection of which causes a generating a cropped video according to the selected parameters. The parameters include, for example, the size of the second area, the location of the second area, whether or not to track a point, the video data file size, the aspect ratio, and the spatial resolution.

In particular, after selecting the new parameters control or icon 1406, the request to generate a cropped video according to the defined parameters is sent to the video server. The request is added to a queue of orders to generate derivative video data.

In an example embodiment, the requests to generate cropped videos are processed by the video server in the order in which the requests are made.

As shown in FIG. 14, the second area 1402 may be presented in the original clarity of the original video being displayed, while the remaining area of the video imagery may be presented in as visually obscured. In particular, a dark translucent mask or layer may be applied over the surrounding video imagery.

Figure 15:
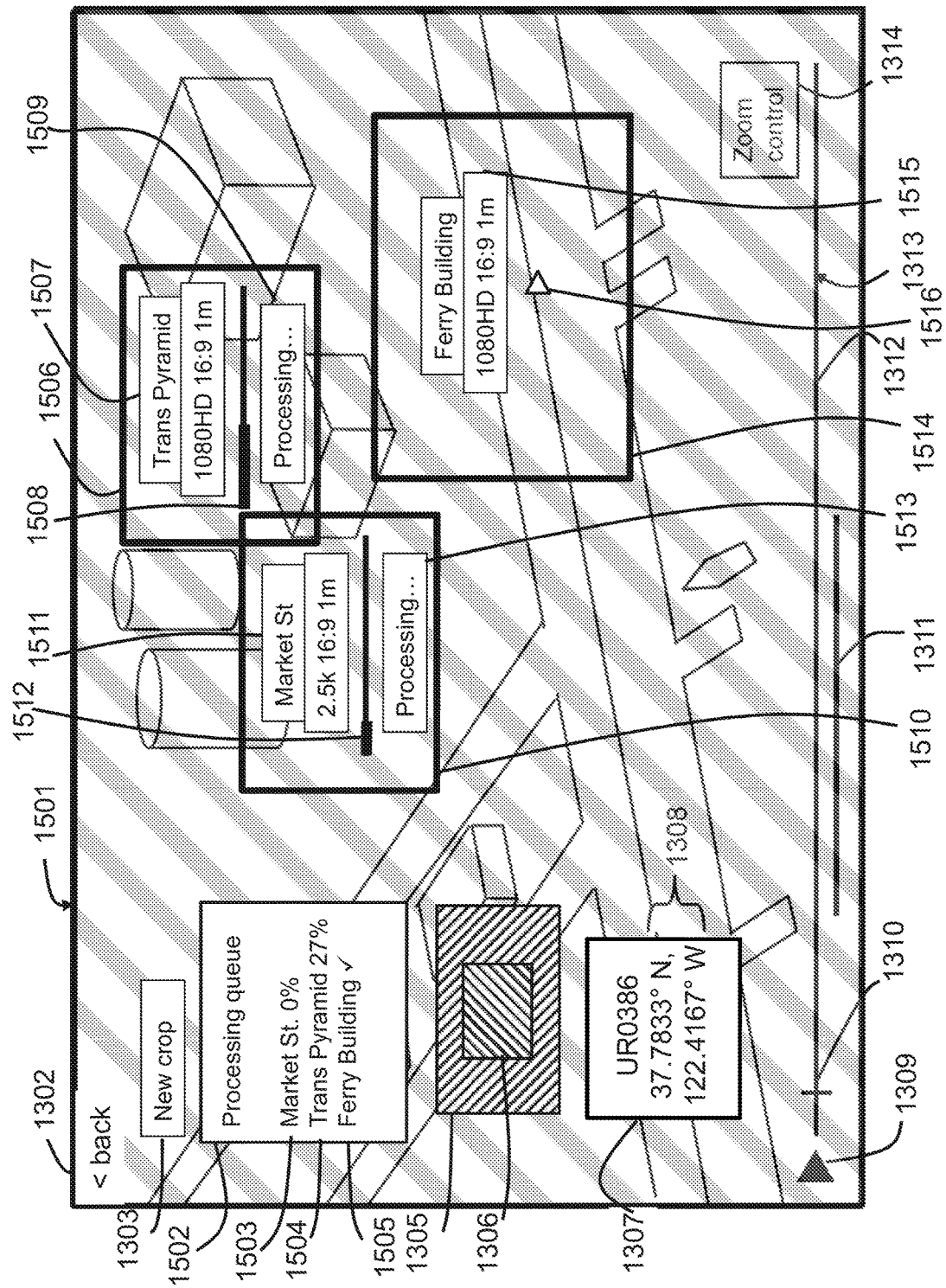
FIG. 15 is an example screen shot of a video of a selected product where multiple cropped videos are loading or have already loaded.

Continuing from FIG. 14, and turning to FIG. 15, another instance of a video display interface 1501 is shown, which is similar to the interface 1401. The second area 1402 is shown in FIG. 15 as an outline 1510. An information or dialog box or field 1511 shows parameters of the cropped video corresponding to the second area 1510. The parameters include the name of the cropped video (e.g. 'Market St.'), the pixel resolution of the video data file (e.g. 1920× 1080 pixels), the aspect ratio (e.g. 16:9), and the spatial resolution (e.g. 1 m). A status indicator field 1513 shows the status of the cropped video of the second area. In this case the status is indicated as 'processing'. Other examples of statuses include queued, completed, and failed; other statuses may also be used. As the status indicator field 1513 shows the cropped video is 'processing', a progress indicator 1512 is displayed that shows the current progress state of processing the cropped video. The progress indicator 1512 may, for example, take the form of a bar showing a percentage of completed processing and the percentage of processing to be completed. Other ways to indicate the current progress may be used in the alternative, or in combination with the progress bar.

A third area is outlined by a box 1506, for which a second cropped video is currently being processed. The third area is a subset within the area of the selected video of downtown San Francisco. An information or dialog box or field 1507 corresponding to the third area shows parameters regarding the second cropped video, including the name (e.g. 'Trans pyramid'), the video format (e.g. 1080 HD), the aspect ratio (e.g. 16:9), and the spatial resolution (e.g. 5 meters). The video format and the aspect ratio define a video frame size. For example, a pixel resolution of 1080 HD and an aspect ratio of 16:9 define a video frame size of 1,920 pixels by 1,080 pixels. A progress indicator 1508 and a status indicator 1509 are also provided. It is noted that the third area overlaps a portion of the second area.

A fourth area is outlined by a box 1514. The fourth area is a subset of the first area shown in the video display interface 1501. A third cropped video has been processed based on the fourth area. A status indicator 1516 indicates that the third cropped video is ready to be played or previewed. In other words, when the status indicator icon 1516 (e.g. a play button) is selected, the video server is instructed to provide the third cropped video to the client device to be played in preview mode on the client device. The information or dialog box or field 1515 associated with the third cropped video shows parameters of the third cropped video, such as a name (e.g. 'Ferry building'), a pixel resolution (e.g. 1080 HD), an aspect ratio (e.g. 16:9), and a spatial resolution (e.g. 1 meter).

It will be understood that multiple areas, which are a subset of the first area of the original video, may be defined and used to generate corresponding multiple cropped videos that are derivative video data of the original video.

An expanded processing queue list 1502 is shown and it includes an entry for the first cropped video 1503 (e.g. named 'Market St.'), an entry for the second cropped video (e.g. named 'Trans Pyramid'), and an entry for the third cropped video (e.g. named 'Ferry building'). The entries in the list 1502 also display an associated progress indicator that indicates whether a given cropped video is still being processed and at what percentage is the processing complete.

Figure 16:
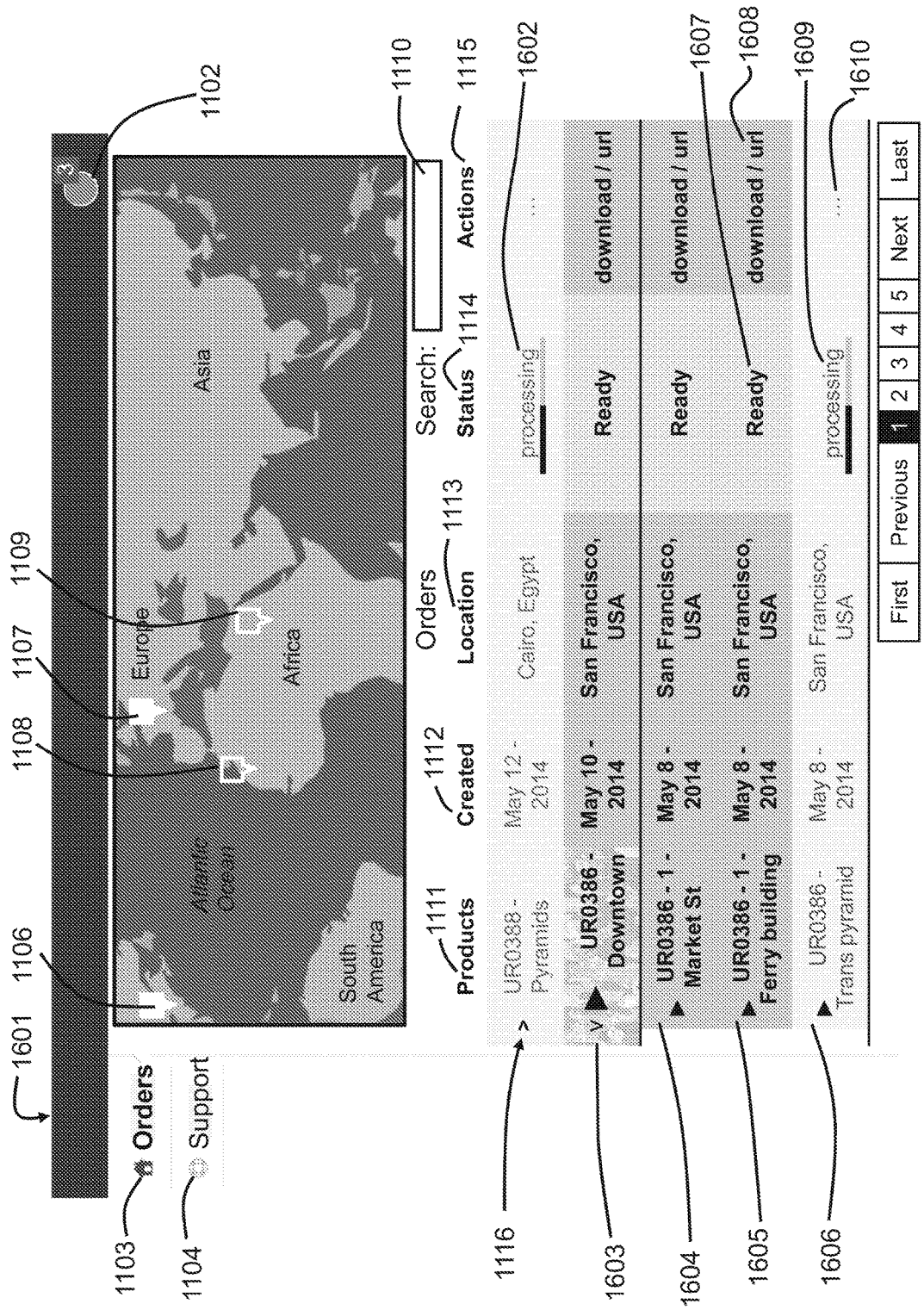
FIG. 16 is an example screen shot of the main window where the cropped videos are included as new products.

Turning from FIG. 15 to FIG. 16, another instance of a video dissemination portal 1601 is shown, based on the first, second and third cropped videos shown in FIG. 15. The video dissemination portal shows that the status of the Cairo video data order 1116 is no longer being queued, but is currently being processed 1602. The processing status also includes a progress indicator.

The video data entry field 1603 for downtown San Francisco, which corresponds with the entry referenced by numeral 1118, is shown in a drop-down mode. In particular, shown in association with the original video data entry field 1603 are derivative video data files or cropped videos that are cropped from the original video data of downtown San Francisco. The related entries 1604, 1605 and 1606 are for the first cropped video, the second cropped video and the third cropped video, respectively.

In an example embodiment, the drop-down entry field for the second cropped video 1605 displays a 'ready' status 1607, meaning the second cropped video has finished being processed and is available to be downloaded. Accordingly, the available user selectable action control or action controls or icons 1608 that are presented include options for downloading the second cropped video to the client device and providing a URL or data link to the second cropped video.

In another example embodiment, the drop-down entry for the third cropped video 1606 shows a 'processing' status in status field 1609, including progress indicator. Accordingly, there are no action controls that are available in the corresponding action control field, as visually indicated using the ellipses 1610.

Figure 17:
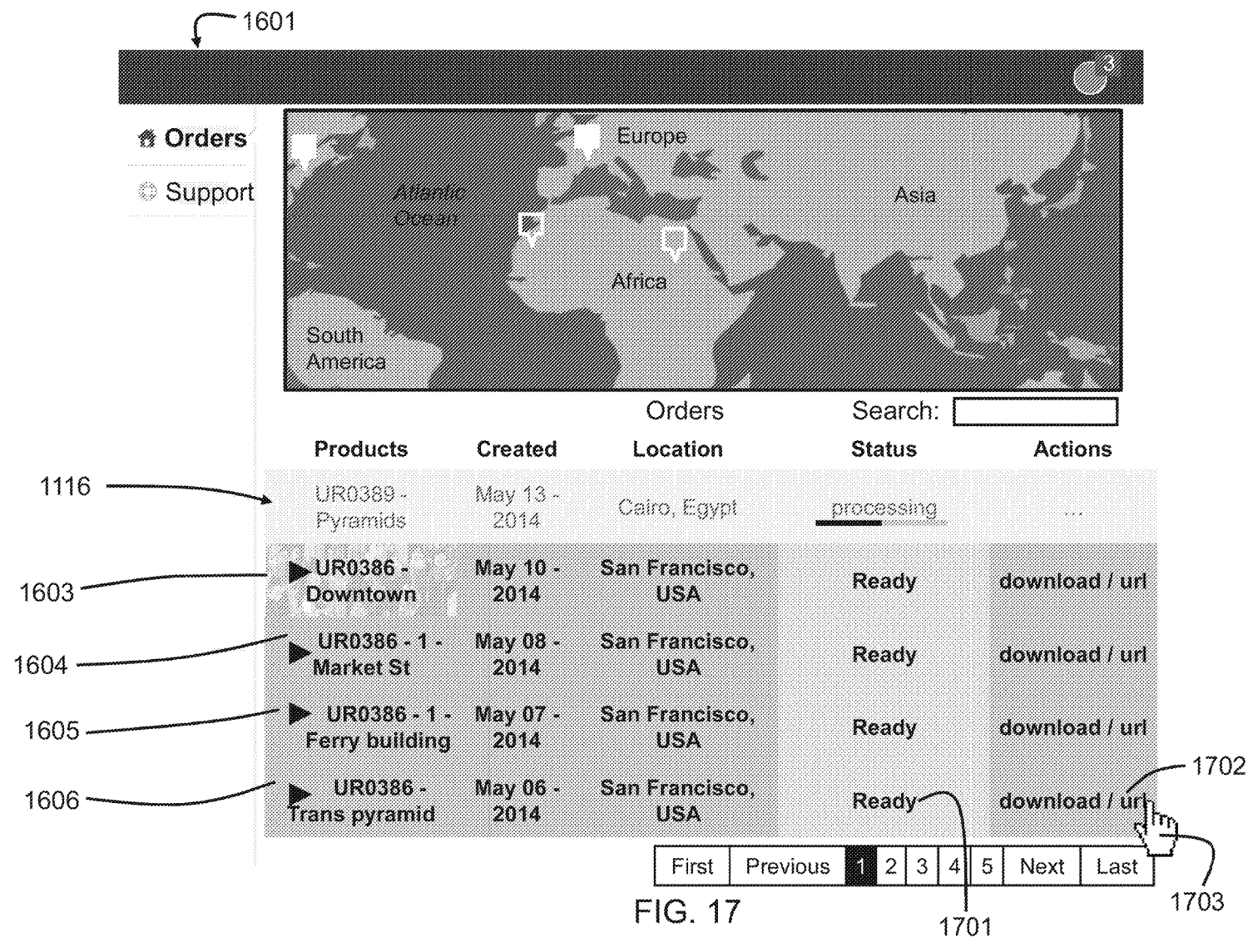

Continuing from FIG. 16 to FIG. 17, after the third cropped video has finished processing, it is ready to be downloaded, as per the 'ready' status 1701 in FIG. 17. Accordingly, the available user selectable action control or action controls or icons 1702 that are presented include options for downloading the third cropped video onto the client device and providing a URL or data link to the third cropped video.

A downloading user interface is displayed in response to selection input to download the third cropped video, selected for example using the pointer 1703.

Figure 18:
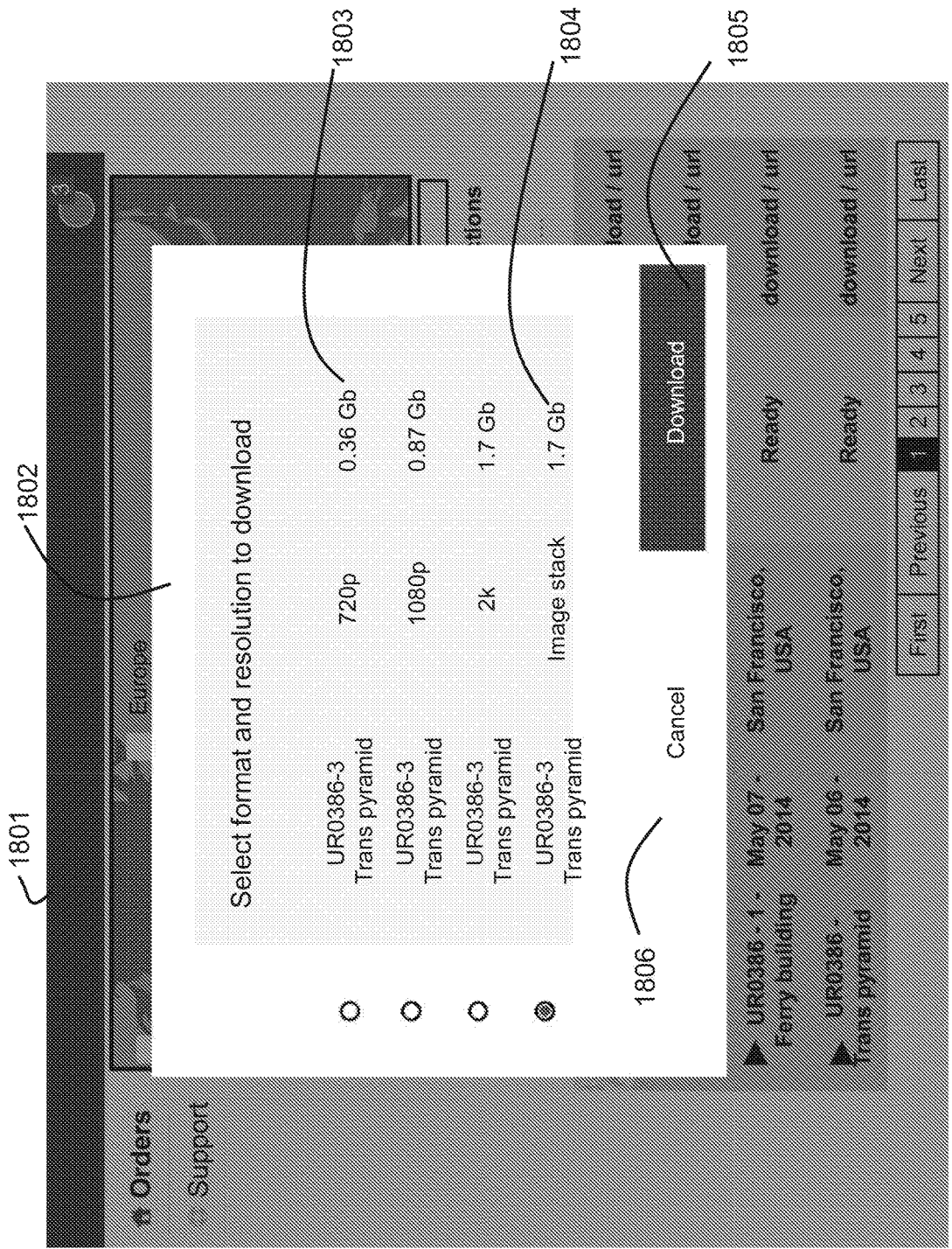
FIG. 18 is an example screen shot of a download window with a popup dialog box from which multiple file sizes and resolutions can be downloaded.

Turning to FIG. 18, an example of the downloading interface 1802 is displayed overlaid on a video dissemination portal interface 1801. In an example embodiment, video dissemination portal, which is a background to the downloading interface, is visually obscured so as to visually emphasize the downloading interface 1802.

The interface 1802 includes a listing of video formatting options, which can be used to format the video prior to downloading the video. For example, the options include selecting a certain video format (e.g. 1080×720 pixel video format), or selecting an image stack. An image stack is a set of images that are comprised of a sequence of frames captured from the sensor in a particular time order.

Furthermore, each option may be associated with an estimated file size.

For example, one user selectable option 1803 is to download the third cropped video according to a 720 pixel resolution, having an estimated file size of 0.36 GB. Another user selectable option 1804 is to download the third cropped video according the image stack, which will have an estimated file size of 1.7 GB. Selection may be by way of selecting a corresponding radio button.

The option 1804 is selected, either by default or manually, for example. The downloading interface may include a user selectable cancel control or icon 1806, selection of which cancels the download of the currently selected cropped video (e.g., third cropped video). The downloading interface may include a user selectable download control or icon 1805, selection of which triggers a downloading of the currently selected cropped video (e.g., third cropped video) according to the selected option.

Figure 19:
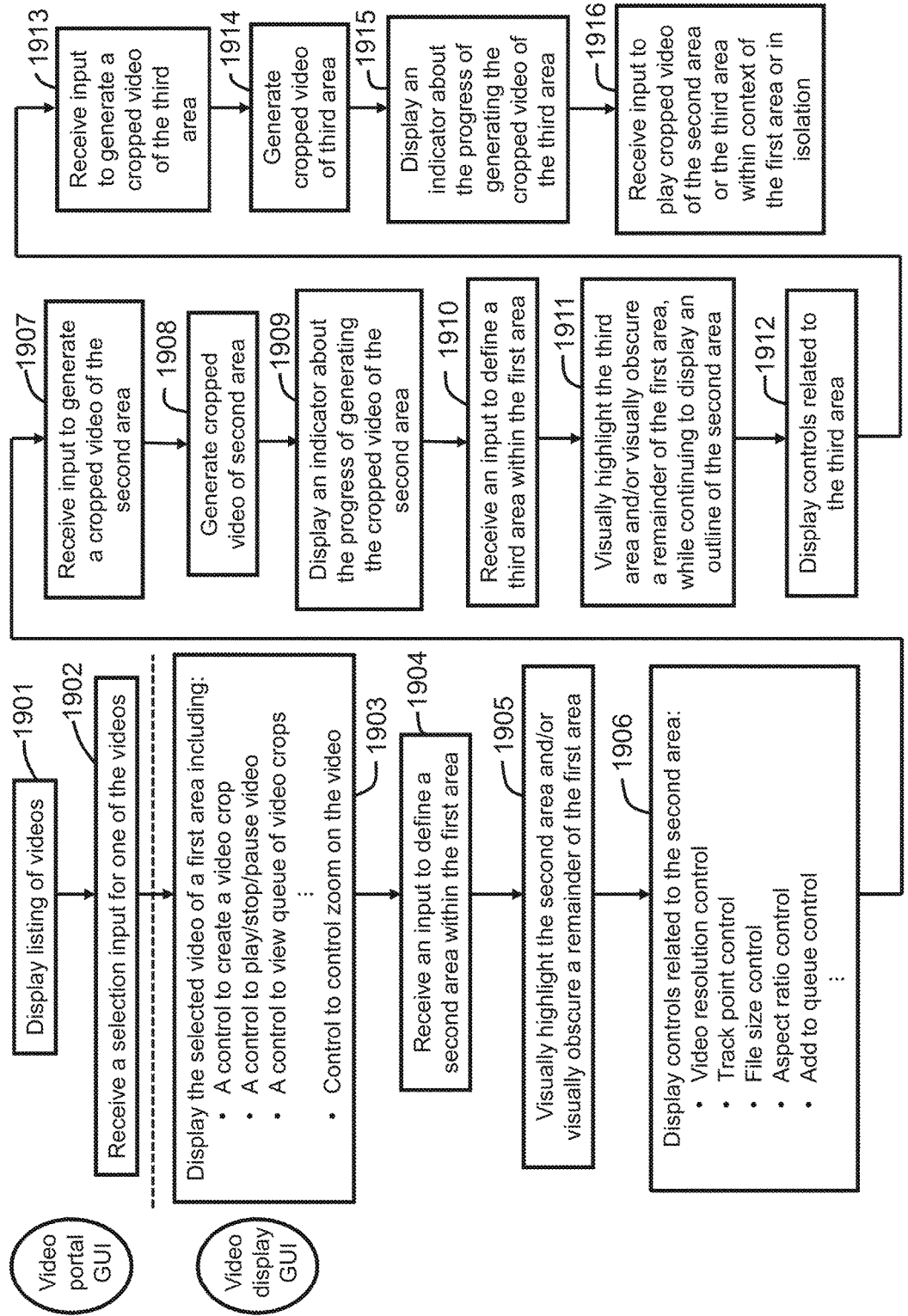
FIG. 19 is a flow diagram illustrating an example method performable by at least one processor that executes computer executable or processor implemented instructions for selecting, and processing cropped videos.

FIG. 19 shows an example method of operation, performable by at least one processor that executes stored computer-executable instructions, or processor-implemented instructions to provide cropping of one or more videos. These instructions, for example, are executed by one or more processors of a video server 401 (FIG. 4), or a combination of a video data server and a client device 403 (FIG. 4). The method, however, is described from the perspective of the video server for consistency in the example.

At 1901, the video server causes the display of a listing of videos. At 1902, the video data server receives a selection input for one of the videos. The operations of 1901 and 1902 are performed within the context of the video dissemination portal.

At 1903, the video server causes a display of the selected video, which has a first area. The display of the selected video includes, for example: a control create a cropped video, a control to play/pause/stop the selected video, a control to view a queue of cropped videos, and a control to control the zoom of the selected video.

At 1904, the video server receives an input to define a second area within the first area. At 1905, the video data server causes the second area to be visually highlighted, or in the alternative, or in combination, visually obscures a remainder of the first area.

At block, the video server causes display of user selectable controls (e.g. user selectable icons or other elements of a graphical user interface) related to the second area, including, for example: a video resolution control, a track point control, a file size control, an aspect ratio control, and an add-to-queue control. Other controls may be provided.

At block, the video server receives an input to generate a cropped video of the second area. After, the video server generates a cropped video of the second area at 1908, according to the parameters defined at 1905.

At 1909, the video server displays or causes to be display an indicator about the progress of generating the cropped video of the second area.

At 1910, the video server receives an input to define a third area within the first area. At 1911, the video server causes a visually highlighting or other visual emphasizing of the third area, and/or visually obscures a remainder of the first area, or both, all while continuing to cause display of an outline of the second area.

At 1912, video server causes display of controls related to the third area, similar to 1906. At 1913, the video server receives an input to generate a cropped video of the third area. At 1914, the video server generates or causes generation of the cropped video of the third area.

At 1915, the video server causes a display of a progress indicator showing the progress of generating the cropped video of the third area is displayed.

At 1916, the video server receives an input to play the cropped video of the second area, or to play the cropped video of the third area. The cropped video may be previewed in the context of the first area, or is previewed in isolation.

It will be appreciated that operations related to acts 1903 to 1916 occur within the context of a video display user interface, which may be presented by an end user device and provided or controlled by a video server.

Figure 20:
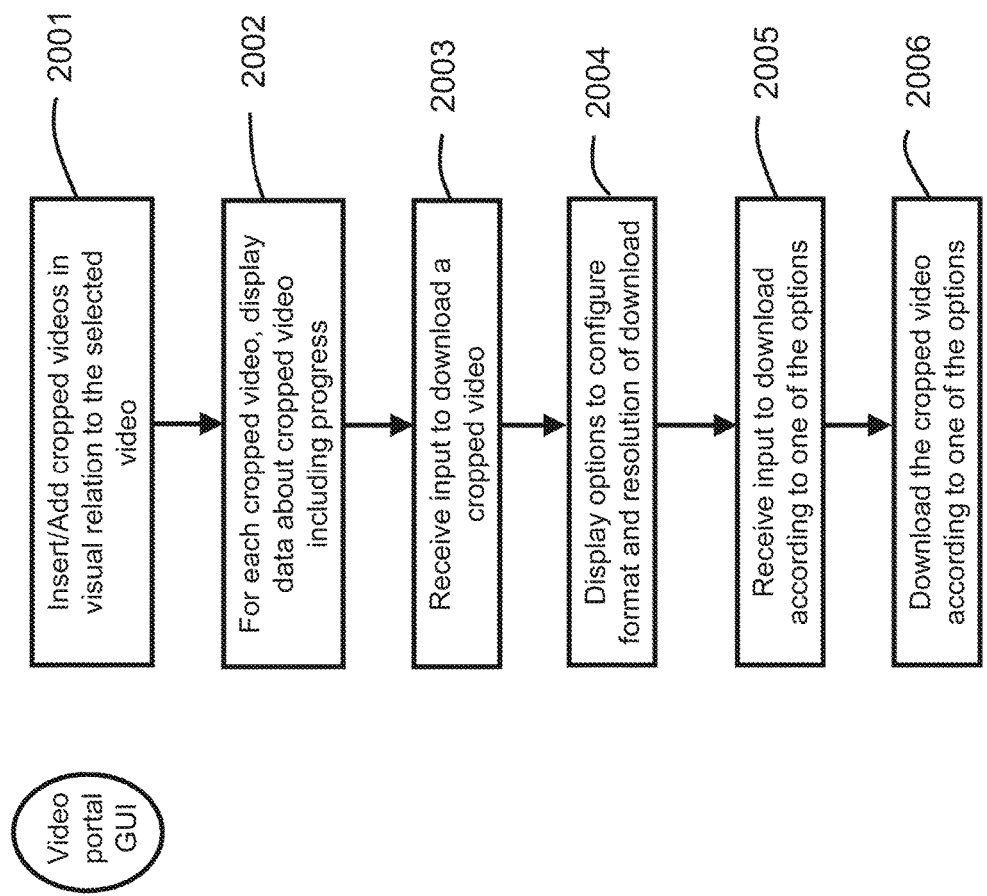
FIG. 20 is a flow diagram illustrating an example method performable by at least one processor that executes computer executable or processor implemented instructions for downloading cropped videos.

FIG. 20 shows an exemplary method of operation, performable by at least one processor that executes stored computer-executable instructions, or processor-implemented instructions to provide cropping of one or more videos. The method of FIG. 20 may be performed for example, as continuation of the method of FIG. 19. Similar to the method of FIG. 19, the method of FIG. 20 may be performed by a video server, or a combination of a video server and a client device. The method, however, is described from the perspective from the video data server for consistency in the example.

In an example embodiment, the operations 2001 to 2006 occur within the context of the video dissemination portal GUI.

At 2001, the video server inserts or adds an entry for each cropped video in visual relation to the entry of the selected video. This is shown, for example, in FIG. 16 by entries 1604, 1605 and 1606, in relation to the entry of the selected original video 1603.

At 2002, for each entry of a cropped video, the video server causes data about the cropped video to be displayed. Examples of the displayed data may include one or more of a progress indicator, creation date or time, or both, the location, and associated available actions.

At 2003, the video server receives an input to download a cropped video. At 2004, the video server causes options to configure the format and resolution to be displayed, and these options will be applied to the cropped video to be downloaded. At 2005, the video server receives an input to download the cropped video that has been configured according to a certain format and a certain resolution, as per the selected options.

At 2006, the video server sends the cropped video to the client device. The cropped video has been configured according the selected option. From the client device's perspective, the client device is downloading the cropped video from the video data server or receiving such as streaming content.

Figure 21:
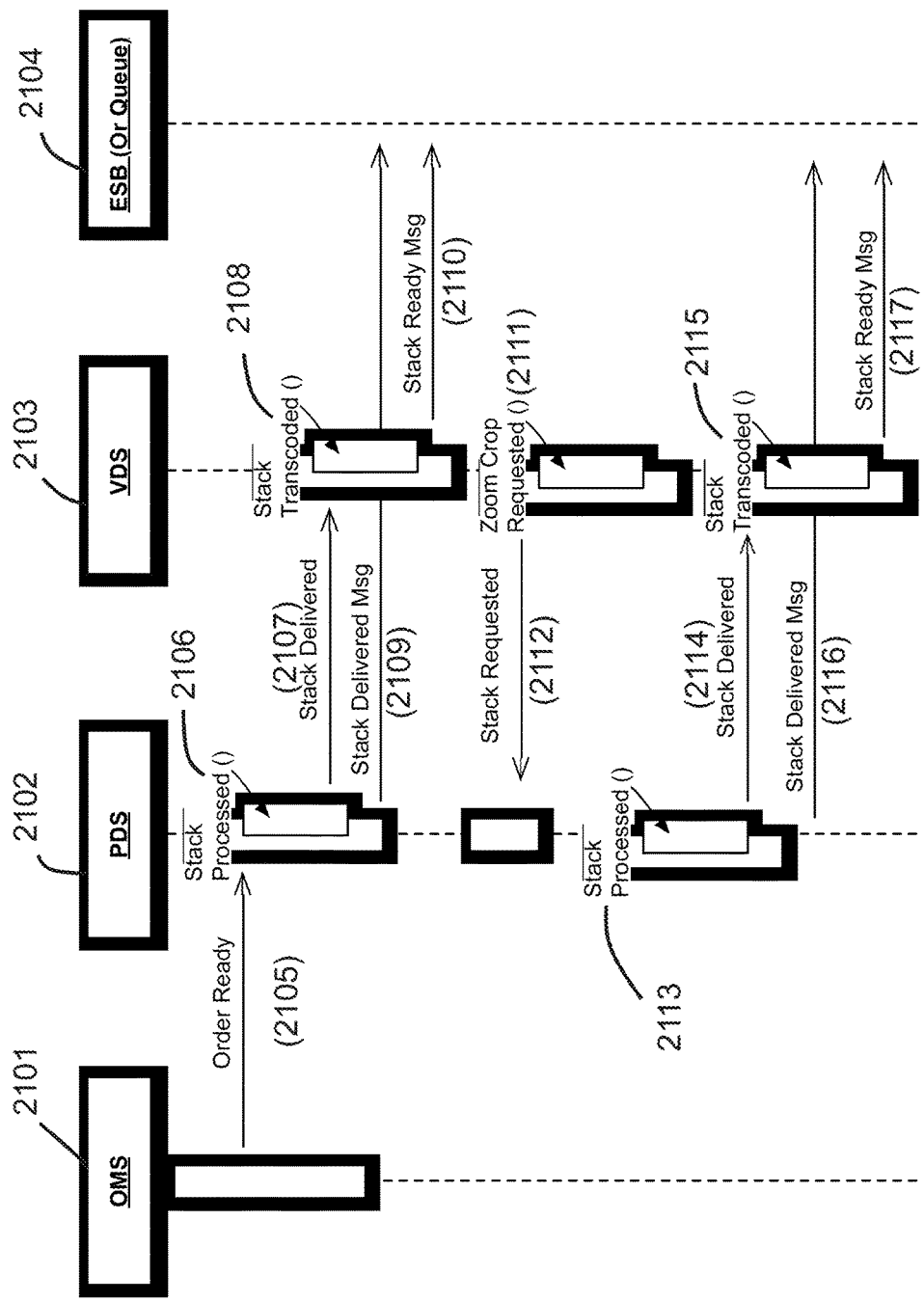
FIG. 21 is a schematic diagram of example components used to process video data and further showing the interaction between the components.

Turning to FIG. 21, example components are provided according to another example embodiment. The components include an order management system (OMS) module 2101, a product delivery system (PDS) module 2102, a video dissemination service (VDS) module 2103, and an enterprise server bus (ESB) 2104. The ESB 2104 may also be referred to as a queue.

Each of these components may be modules or sets of instructions within a single server. In another example embodiment, each of these components is implemented separately as one or more servers. For example, the OMS 2101 is implemented by one or more servers, the PDS 2102 is implemented by one or more servers, the VDS 2103 is implemented by one or more servers, and the ESB 2104 is implemented by one or more servers. It will be appreciated that each server includes a processor, memory, and a communication device.

In an example embodiment, components 2101, 2102, 2103 and 2104 are an implementation of the video server 401 (FIG. 4), and can be used in place of the video server 401. Alternatively, the components 2101, 2102, 2103 and 2104 are used in combination with the video server 401. The components 2101, 2102, 2103 and 2104 are in communication with each other using the data network 405, or using a separate internal data network.

The Product Delivery System (PDS) 2102 includes an online database that is used to control the request and delivery of data products for retrieval by customers or distributors, or both. The Order Management System (OMS) 2101 accepts and stores orders for imagery products, and services and manages the fulfillment of those orders. The PDS 2101 is configured to task processing systems for processing the video and image stack data, and all requests and deliveries are tracked in the OMS. Orders are tracked and feedback is provided to users, via their client device or devices. The Video Dissemination Service (VDS) 2103 is configured to manage the preview, dissemination and visual delivery of video data, including receiving input to define parameters of a cropped video and tasking the generation of the cropped video. The Enterprise Service Bus (ESB) 2104 routes notifications about images and video data to and from various module and devices, including the client device.

Continuing with FIG. 21, the OMS sends a message (operation 2105) to the PDS indicating that an order for certain video data is ready. It can be appreciated that the order was provided by the end user in an earlier process, not shown. The PDS then notifies a Processing System (PS), not shown, to process an image stack according to a certain function (block 2106). After the stack is processed, the PDS sends the stack (operation 2107) to the VDS. After sending the image stack, the PDS sends a message to the ESB indicating the stack was delivered to the VDS (operation 2109) so that the OMS can track the delivery of the product to end user.

After the VDS has received the stack, the VDS transcodes the stack at 2108 using a transcoding software package and related codecs and compression algorithms. The job queue system retains the status of the transcoding process and notifies the integrated systems and end user of the status of the various stages of the transcoding process (queued, processing, completed, failed, etc.).

The transcoded stack usually results in a video product that can play on industry standard video playing software, web browsers, and mobile browsers. After the VDS transcodes the stack, the VDS sends a message to the ESB that the stack is ready to be used for preview and cropping at 2110. The OMS retrieves this message so that it can be used to track every order including derivative cropped video or image stacks with the original order.

After the stack is transcoded, the VDS can perform a zoom crop request operation at 2111. This operation includes receiving parameters to generate a zoomed-in and cropped video derived from the transcoded image stack. Some of the parameters include zoom crop pixel boundaries that directly relate to latitude and longitude coordinates used for georeferencing.

Based on the zoom crop request operation 2111, the VDS sends a request for a stack to the PDS at 2112). In response to a request for the zoomed and the cropped video, and based on information in the request for the zoomed and the cropped video, the PDS processes the stack at 2113.

After the stack for the zoomed and the cropped video is finished processing, the PDS sends the stack to the VDS at 2114. The PDS also sends a message to the ESB that indicates the stack has been sent at 2116.

After the VDS receives the stack for the zoomed and the cropped video, the VDS transcodes the stack at 2115. After transcoding the stack, the VDS sends a message to the ESB that indicates the stack for the zoomed and the cropped video is ready at 2117.

In an example embodiment, downloads are handled over a secure protocol (e.g., HTTPS, SFTP). The VDS needs to create the files to download and move them to the agreed site (within the hosted application environment). Then the VDS initiates the file transfer request to the PDS, and the PDS proxies the request to validate ownership, access rights, and security, tracks the request, then serves the product for download.

In another example embodiment, the VDS may be architected to enable carving out and pushing of video data to a dedicated server. This is to address cases where some customers may not want to use a public online web service to perform video discovery.

In an example embodiment, a user is able to initiate downloads from within the video dissemination portal in accordance with the customer profile access rights assigned to that user.

In an example embodiment, video formats to create for downloads to the customer include: HD (2.5k), having the compression format H.264 and an aspect ratio of 16:9; and UltraHD (4k), having the compression format H.264 and an aspect ratio of 16:9.

In an example discovery experience, original video data can be played to the position that is desired. When the video is paused, the user can select a crop box that is dragged around. The crop box can be selected in one of several sizes, including, but not limited to, HD (2.5k) and UltraHD (4K). The user interface receives a selection to crop and preview the video. During the preview build, there is progress indication, for example a spinner indicator, that shows progress and then visually indicates when the cropped video is ready to preview. There may also be an indicator of the remaining processing time before the preview of the cropped video is ready.

During the current video preview, the end user can resume discovery with the crop box or resume playing the video, and then pause again to use crop box tool. It is possible to use the crop box tool while the video is playing.

When encoding the image stack, the encoding process operates on either the Ortho Stack (e.g. orthorectified, or geometrically corrected for terrain and camera distortions resulting in a uniform scale as commonly utilized in mapping) or the CameraView Stack (e.g. standard camera projection, non-ortho corrected), for example at full resolution.

The encoding of the stack results in creating an intermediate compressed image stack (e.g., HD stack), using currently known and future known compression algorithms and codecs (e.g. H.264, H.265 etc.). This intermediate compressed image stack is used for the transcoding for web and mobile preview to reduce bandwidth, storage, and time required for transcoding and data transfer.

The compressed stack is to be provided, for example, as JPEG files. In another example, the large format stack, which is the original video data, will be used for all transcoding by the VDS. Codecs H.264 and H.265 are used for video encoding. JPEG, PNG, TIFF, are examples of image stack encoding i.e., the encoding of individual frame images.

In an example embodiment, a message is sent from the PDS to the VDS notifying the system that there is a new stack for transcoding, and specifying where the stack is located on the file system.

In an example embodiment of cropping and transcoding, the process includes generating either HD (2.5k) video or UHD (4K) video using the H.264 format. Other formats and resolutions may be used. An example ratio of the cropped video is 16:9, although other aspect ratios can be used. In an example embodiment, the frame rate and compression settings may be adjusted to suit the different parameters, including desired quality, desired file size and desired performance. Examples of performance measurements or characteristics include playback speed, frame skipping and buffering, image quality, etc.

For example, a higher quality and resolution is preferred for downloading to a customer. A lower quality and resolution is preferred for previewing online so that this is fast for the online experience (e.g., 15 fps, higher compression).

A pan path (also referred to as a crop path) defines the trajectory of the center of the derivative video (e.g. cropped video) in the original video. The pan path can be selected by a user and/or determined by the system according to a set of requirements.

In an example embodiment, a pixel coordinate taken from the on-line video display preview is used as input to identify an area to crop out. In an example embodiment, the pan path is a consistent target area or point in a time-ordered sequence through the stack of images, such as a moving object.

In another example embodiment, the pan path is specified as a sequence of offsets between corresponding pairs of video frames in the first sequence of video frames and the second sequence of video frames. The sequence of offset can be determined from geographic or pixel coordinates defining an area of interest. For example, geographic coordinates can be expressed at pairs of latitude and longitude values defining locations on the Earth's surface.

In another example embodiment, the system and/or the user defines the pan path using Ground Moving Target Indication (GMTI), the GMTI derived from the original video and/or ancillary data sources. For example, GMTI can include heading and velocity information related to a detected target in the video.

In yet another example embodiment, the system and/or the user defines the pan path by specifying a first geographic point or area of interest in a first frame of the original video, and a second geographic point or area of interest in a second, subsequent, frame of the original video, and computing a path between the first and second frames.

The system and/or the end user can define a linear pan path or a non-linear pan path. The system and/or the end user may, for example, fit a spline to three or more points determined by the system or specified by the end user.

The orientation of the crop window relative to the original video can vary along the pan path from one frame to another.

It will be appreciated that any module, component, or system exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile memory, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the systems, modules or components of the system shown in FIG. 4 or the system shown in FIG. 21, or both, or accessible or connectable thereto. Any application, system or module herein described may be implemented using computer readable/executable or instructions or operations that may be stored or otherwise held by such computer readable media.

Further example applications and embodiments of the proposed systems and methods are described below.

In an example embodiment, the systems and the methods described herein, including the video dissemination portal, support a data video customer with the ability to login to a secure web application to view their orders, and preview imagery and video from their orders. The preview functionality allows the customer to create derivative imagery or video products from their original order while using a preview and cropping tool.

In another example embodiment, the systems and methods described herein provide a user interface for listing and viewing paginated orders with filtering and searching capabilities. Links are also provided to download a product or image stack. The processing queue status is also displayed to the end user or operator, for example, via a client device. The user interface also provides the ability to update, rename, and tag product names for ease of management.

In another example embodiment, a user interface for the video player is provided for interacting with visualizations of Earth Observation imagery and video over time. Visualizations include enabling and disabling image processing algorithms, imagery overlays captured at different points and time, and layers composed of contextually relevant third party data. Visualizations would be available in both orthorectified and camera view (perspective) formats on the web or mobile device.

In another example embodiment, a crop tool or cropping tool is provided that allows a user to create new, derivative videos from within a crop box and shows a processing indicator (e.g. a spinner) for videos being currently processed. The crop box has a resolution selector, located in visual relation to the crop box, to define the cropped video's resolution.

In another example embodiment, user Login and Signup data is used for geolocating users. In particular, the systems and methods described herein include obtaining the location of an end user (e.g. via IP address, GPS, or via user input). The system uses the location of the end user to display, on a user interface, georeferenced Earth Observation imagery centered on the location associated with the user's login location information. The imagery or video reacts (e.g. via color saturation, blur, perspective, and motion) when a focus of an end user is placed on form elements within the user interface. For example, the center location of the map 1105 may be located at the same geographic location as an end user that is using the system.

In another example embodiment, the systems and methods are used for automated and crowd sourced cloud mapping and change detection. In particular, a method, system, and related computer algorithms for automated or crowd sourced data points related to cloud coverage and change detection of geospatial data by cross correlating social, weather, and other crowd sourced data, include using data visualization to display this information to a user. Analytics from cropping and user behaviour can be used to provide actionable insights and recommendations to video data server, and to end users.

In another example embodiment, an Earth Observation platform is provided, which can obtain imagery, video, and other remote sensing data of the Earth or other objects in space. The remote sensing data may also be obtained from the International Space Station, other manned (spacecraft, aircraft), or unmanned aerial vehicles (UAVs, spacecraft probes). A sensor captures observation data and transmits the data to ground stations on the Earth. The ground stations receive the Earth Observation data. An archiving system stores the sensor observation data. Customers or users use the OMS to place orders for the observation data, which specify processing parameters for the Earth Observation data. Based on the orders, a processing system retrieves the Earth Observation data from the archiving system and processes the Earth Observation data according to the parameters to generate an Earth Observation data product.

This system provides unique tools for searching, browsing, and analyzing the data as well as capabilities for interacting with the system through an API. The system is configured to combine observation data (e.g., remote sensing data) from sources produced internally by the observation platform and by third parties. The ordered video data can be previewed, managed and downloaded onto a client device using a video dissemination portal. One or more cropped videos can be derived from the ordered video data.

The elements in the GUIs described or shown herein are just examples. There may be many variations to these GUI elements without departing from the spirit of the invention. For instance, buttons, images, graphs, user selectable icons, dialog boxes, user fillable fields and other GUI controls may be displayed and operated in a differing order; or buttons, images, graphs, and other GUI controls may be added, deleted, or modified.

The acts or operations in the flow charts described herein are just examples. There may be many variations to these acts or operations without departing from the spirit of the invention. For instance, the acts may be performed in a differing order, and/or acts may be added, deleted, or modified.

The teachings of U.S. Provisional Application No. 62/011,935 having a filing date of Jun. 13, 2014 entitled "Systems and Methods For Processing and Providing Video" is hereby incorporated in its entirety by reference.

Although the above has been described with reference to certain specific embodiments, various modifications thereof will be apparent to those skilled in the art as outlined in the appended claims.

The invention claimed is:

1. A method for disseminating video data to a user, the video data derived from a set of raw sensor data, the method comprising:
   processing the set of raw sensor data into a first set of video data, the first set of video data comprising a first sequence of video frames, each video frame in the first sequence of video frames having a first video frame size;
   providing at least a portion of the first set of video data for presentation on a video display interface;
   receiving one or more user input values; and
   generating a second set of video data comprising a second sequence of video frames, a number of video frames in the second sequence of video frames corresponding to respective ones of a number of video frames in the first sequence of video frames and having a second video frame size, the second video frame size less than the first video frame size, and the center of each video frame in the second sequence of video frames positioned at an offset from the center of the corresponding video frame in the first sequence of video frames, the offset determined from the one or more user input values, the offset for a first frame in the second sequence of video frames different from the offset for a second frame in the second sequence of video frames, wherein:
      receiving the one or more user input values includes receiving at least one user input value that specifies a pan path, the pan path comprising a sequence of offsets between corresponding pairs of video frames in the first sequence of video frames and the second sequence of video frames;
   processing the set of raw sensor data into a first set of video data includes processing imaging data, the imaging data comprising a plurality of temporally sequential frames of images that were captured at one or more frequencies in the electromagnetic spectrum by a camera, the camera pointed towards the Earth to capture images of a portion of a surface of the Earth;
   receiving at least one user input value that specifies a pan path includes receiving a number of coordinates that define a geographic region of interest on the surface of the Earth; and
   receiving a number of coordinates that define a geographic region of interest includes receiving a latitude value and a longitude value for one or more locations defining the geographic region of interest on the surface of the Earth.

2. The method of claim 1, further comprising:
   providing the second set of video data to an end user device.

3. The method of claim 2 wherein receiving the one or more user input values includes receiving the one or more user input values via the video display interface.

4. The method of claim 2 wherein providing the second set of video data to an end user device includes providing the second set of video data for display by the end user device.

5. The method of claim 2 wherein providing the second set of video data to an end user device includes providing the second set of video data in a downloadable format.

6. The method of claim 1 wherein one or more video frames in the second sequence of video frames is oriented at an angle of rotation relative to the corresponding one or more video frames in the first sequence of video frames.

7. The method of claim 6 wherein the angle of rotation of a first video frame in the second sequence of video frames is different from the angle of rotation of a second video frame in the second sequence of video frames.

8. A method for disseminating video data to a user, the video data derived from a set of raw sensor data, the method comprising:
   processing the set of raw sensor data into a first set of video data, the first set of video data comprising a first sequence of video frames, each video frame in the first sequence of video frames having a first video frame size;
   providing at least a portion of the first set of video data for presentation on a video display interface;
   receiving one or more user input values; and
   generating a second set of video data comprising a second sequence of video frames, a number of video frames in the second sequence of video frames corresponding to respective ones of a number of video frames in the first sequence of video frames and having a second video frame size, the second video frame size less than the first video frame size, and the center of each video frame in the second sequence of video frames positioned at an offset from the center of the corresponding video frame in the first sequence of video frames, the offset determined from the one or more user input values, the offset for a first frame in the second sequence of video frames different from the offset for a second frame in the second sequence of video frames, wherein:
      receiving the one or more user input values includes receiving at least one user input value that specifies a pan path, the pan path comprising a sequence of offsets between corresponding pairs of video frames in the first sequence of video frames and the second sequence of video frames;

processing the set of raw sensor data into a first set of video data includes processing imaging data, the imaging data comprising a plurality of temporally sequential frames of images that were captured at one or more frequencies in the electromagnetic spectrum by a camera, the camera pointed towards the Earth to capture images of a portion of a surface of the Earth;

receiving at least one user input value that specifies a pan path includes receiving a number of coordinates that define a geographic region of interest on the surface of the Earth; and receiving at least one user input value that specifies a pan path includes receiving a set of ground moving target indication (GMTI) information for one or more moving targets of interest.

9. The method of claim 8 wherein receiving GMTI information for the one or more moving targets of interest includes receiving at least one piece of heading information and at least one piece of velocity information.

10. The method of claim 8, further comprising:
providing the second set of video data to an end user device.

11. The method of claim 10 wherein receiving the one or more user input values includes receiving the one or more user input values via the video display interface.

12. The method of claim 10 wherein providing the second set of video data to an end user device includes providing the second set of video data for display by the end user device.

13. The method of claim 10 wherein providing the second set of video data to an end user device includes providing the second set of video data in a downloadable format.

14. The method of claim 8 wherein one or more video frames in the second sequence of video frames is oriented at an angle of rotation relative to the corresponding one or more video frames in the first sequence of video frames.

15. The method of claim 14 wherein the angle of rotation of a first video frame in the second sequence of video frames is different from the angle of rotation of a second video frame in the second sequence of video frames.

* * * * *